US012682315B2

(12) United States Patent
Martin et al.

(10) Patent No.: US 12,682,315 B2
(45) Date of Patent: Jul. 14, 2026

(54) SYSTEM AND METHOD FOR DYNAMIC ASSET TRACKING AND MONITORING

(71) Applicant: System Loco Ltd., Lancaster (GB)

(72) Inventors: Ian Martin, Lancaster (GB); Souroush Honary, Lancaster (GB); Andrew Parkins, Ramsey (IM); Theodore Wlazlowski, Corinth, TX (US)

(73) Assignee: System Loco Ltd., Lancaster (GB)

( * ) Notice: Subject to any disclaimer, the term of this patent is extended or adjusted under 35 U.S.C. 154(b) by 349 days.

(21) Appl. No.: 18/166,329

(22) Filed: Feb. 8, 2023

(65) Prior Publication Data

US 2023/0252413 A1 Aug. 10, 2023

Related U.S. Application Data

(60) Provisional application No. 63/267,705, filed on Feb. 8, 2022.

(51) Int. Cl.
*G06Q 10/087* (2023.01)

(52) U.S. Cl.
CPC .................................. *G06Q 10/087* (2013.01)

(58) Field of Classification Search
CPC .. G06Q 10/087; G06Q 10/0833; G06Q 10/08; G06Q 10/06; G06Q 20/203; G06Q 50/10; G06Q 10/06315; G06Q 30/0623; G06Q 50/04; H04W 4/029; H04W 4/02; H04W 4/025; H04W 4/80; H04W 64/003;
(Continued)

(56) References Cited

U.S. PATENT DOCUMENTS

| | | | |
|---|---|---|---|
| 7,746,228 | B2 | 6/2010 | Sensenig et al. |
| 8,854,205 | B2 | 10/2014 | Daniel |
| 10,079,898 | B2 | 9/2018 | Lau et al. |
| 10,877,013 | B2 | 12/2020 | Mandava et al. |
| 10,896,587 | B2 | 1/2021 | Skaaksrud |
| 10,949,417 | B2 | 3/2021 | Kurian et al. |

(Continued)

FOREIGN PATENT DOCUMENTS

| | | |
|---|---|---|
| EP | 3719725 A1 | 10/2020 |
| WO | WO2006074465 A2 | 6/2007 |

(Continued)

OTHER PUBLICATIONS

Wu, Chun-Ho, et al. "A Blockchain-IoT Platform for the Smart Pallet Pooling Management." Sensors 21.18 (2021): 6310.

(Continued)

*Primary Examiner* — Avia Salman
(74) *Attorney, Agent, or Firm* — Schultz & Associates, P.C.

(57) ABSTRACT

The invention is comprised of a self-constructed group of identical hubs, which extends the usable battery life of all hubs in the group by forming a self-healing network that eliminates unnecessary network traffic and assures communication integrity. The group communicates with a larger system which includes a server and various administrative devices that are used to monitor the location and status of the hubs and the palletized goods. Each hub is a stand-alone device that has a processor, memory, GPS transponder, various transceiver circuits, condition indicators, and a battery. Each hub is attached to a single pallet. The hubs are each capable of communication with the server through a variety of transceivers. However, only the hub that is determined by the group to be the best, communicates with the server at any one time.

33 Claims, 17 Drawing Sheets

(58) Field of Classification Search

CPC ..... H04W 76/40; H04W 4/021; H04W 4/024; H04W 4/185; H04W 4/33; H04W 4/40; H04W 52/0212; H04W 84/14; H04W 4/35; H04W 4/38; B60R 25/24; G01S 5/04; G01S 5/14; G01S 5/02; G01S 5/0295; G08B 21/0238; G08B 21/0269; G08B 21/0283; G08B 13/2417; G08B 13/2462; G08B 21/18; G08C 17/02; H01Q 1/22; H01Q 1/2216; H01Q 1/2225; H04B 1/40; H04B 1/707; H04B 1/70752; H04B 1/708; H04B 1/1607; H04B 17/22; H04L 67/04; H04L 67/1097; H04L 67/12; H04L 67/34; A61B 2560/0214; A61B 5/0537; A61B 5/073; A61B 5/4848; A61B 5/6861

USPC .......................................................... 708/28

See application file for complete search history.

(56) References Cited

U.S. PATENT DOCUMENTS

| | | | |
|---|---|---|---|
| 11,062,258 | B2 | 7/2021 | Fernandez |
| 11,088,830 | B2 | 8/2021 | Gu et al. |
| 2007/0174148 | A1 | 7/2007 | Schuler et al. |
| 2007/0276984 | A1* | 11/2007 | Schuessler ........... G06K 7/0008 |
| | | | 711/213 |
| 2016/0379163 | A1 | 12/2016 | Johanson et al. |
| 2016/0379165 | A1 | 12/2016 | Moakley |
| 2018/0144288 | A1 | 5/2018 | Sayed et al. |
| 2019/0258993 | A1 | 8/2019 | Olsen et al. |
| 2020/0098241 | A1* | 3/2020 | Skaaksrud ........... G01N 33/004 |
| 2020/0126033 | A1* | 4/2020 | Albrecht ................ G06Q 10/08 |
| 2020/0165032 | A1 | 5/2020 | De Bokx et al. |
| 2020/0202451 | A1 | 6/2020 | Jones et al. |
| 2021/0009310 | A1 | 1/2021 | Moeller et al. |
| 2021/0057920 | A1* | 2/2021 | Husain .................... G06N 3/084 |
| 2021/0125143 | A1 | 4/2021 | Bartlett |
| 2021/0287163 | A1 | 9/2021 | N et al. |

FOREIGN PATENT DOCUMENTS

| | | |
|---|---|---|
| WO | WO2020047547 A1 | 3/2020 |
| WO | WO2021156865 A1 | 8/2021 |

OTHER PUBLICATIONS

Ren, Jianwei, et al. "An optimization model for the operations of a pallet pool with both radio-frequency identification tagged pallets and non-tagged pallets." Advances in Mechanical Engineering 10.1 (2018).

Won, Jong Un, Yonghoon Choi, and Jong Heung Park. "Pallet management system based on RFID in the postal logistics." International Journal of Services Operations and Informatics 1.4 (2006): 321-331.

Von Neumann architecture, Wikipedia, https://en.wikipedia.org/wiki/Von_Neumann_architecture, last accessed Dec. 16, 2025.

Desktop computer, Wikipedia, https://en.wikipedia.org/wiki/Desktop_computer, last accessed Dec. 16, 2025.

Embedded Systems, ScienceDirect Topics https://www.sciencedirect.com/topics/computer-science/embedded-systems, last accessed Dec. 16, 2025.

Embedded Systems: Essential Basics, AllPCB https://www.allpcb.com/allelectrohub/embedded-systems-essential-basics, last accessed Dec. 16, 2025.

Differences Between Microcontrollers and Microprocessors in Embedded Systems, Nevsemi Electronics, https://www.nevsemi.com/blog/differences-between-microcontrollers-and-microprocessors-in-embedded-systems, last accessed Dec. 16, 2025.

Microcontrollers: The Heart of Embedded Systems, Hyphen Deux, https://hyphendeux. com/microcontrollers-the-heart-of-embedded-systems, last accessed Dec. 16, 2025.

Wu, Zhenyu, Kai Qiu, and Jianguo Zhang. "A smart microcontroller architecture for the internet of things." Sensors 20.7 (2020): 1821, § 2.1.

You, et al. "Low-power wireless sensor network using fine-grain control of sensor module power mode." Sensors 21.9 (2021): 3198.

Wan, Hao and Yonghua Li, "Design and implementation of resource management network of constrained device." 2017 3rd IEEE International Conference on Computer and Communications (ICCC). IEEE, 2017.

Fogel, Menasheh, et al. "Automated tracking of pallets in warehouses: Beacon layout and asymmetric ultrasound observation models." 2007 IEEE International Conference on Automation Science and Engineering. IEEE, 2007.

Torres-Sanchez, Roque, et al. "Design of a distributed wireless sensor platform for monitoring and real-time communication of the environmental variables during the supply chain of perishable commodities." Applied Sciences 11.13 (2021): 6183.

Song, Yanxing, et al. "Applications of the Internet of Things (IoT) in smart logistics: A comprehensive survey." IEEE Internet of Things Journal 8.6 (2020): 4250-4274.

Ogundile, Olayinka O., and Attahiru S. Alfa. "A survey on an energy-efficient and energy-balanced routing protocol for wireless sensor networks." Sensors 17.5 (2017): 1084.

Nakas, Christos, Dionisis Kandris, and Georgios Visvardis. "Energy efficient routing in wireless sensor networks: A comprehensive survey." Algorithms 13.3 (2020): 72.

Wirepas Mesh Overview, Product Description WP-PD-123, v1.0A (2018).

* cited by examiner

305

402 ~ START

404 ~ GET INTERNAL DYNAMIC PARAMETERS

406 ~ GET MAGIC NUMBER

408 ~ SIGN MAGIC NUMBER

410 ~ ASSEMBLE DYNAMIC

416 ~ RETURN

```
1      TDeviceID_Short DeviceAddress;
2      //
3      //
4      uint8_t TAG_CUSTOM[4];
5      union {
6         struct {
7            //
8            //
9            //
10           uint8_t SequenceNumber[5];
11           uint8_t Humidity;
12           uint8_t Humidity_Temperature_Fractions;
13           struct {
14              uint8_t x;
15              uint8_t y;
16              uint8_t z;
17           } __attribute__ ((packed)) Orientation;
18           uint32_t ExtremeTemp;
19           uint8_t SampleCount;
20           uint8_t BRIEF_MAGIC;
21           union {
22              uint64_t magicValue;
23              uint8_t signature[8];
24           };
25           uint8_t BatteryLevel;
26           uint8_t Temperature;
27        } __attribute__ ((packed)) Variant7;
28        struct {
29           //
30           uint8_t SequenceNumber[5];
31           uint16_t DynamicID;
32           struct {
33              unsigned int BatteryStatus:2;
34              unsigned int GPSFix:1;
35              unsigned int WiFi:1;
36              unsigned int FixedLocation:1;
37              unsigned int Moving:1;
38           } __attribute__ ((packed)) Context;
39           struct {
40              uint8_t DeviceSignature[8];
41              uint8_t GroupSignature[8];
42           } __attribute__ ((packed));
43           uint8_t lastReportTime;
44           uint8_t briefMagic;
45        } __attribute__ ((packed)) Variant8;
46     }
```

| PREDICATE WORD | | | | | FUNCTION SET |
| --- | --- | --- | --- | --- | --- |
| $P_1$ | $P_2$ | $P_3$ | $P_4$ | $P_5$ | |
| BATTERY STATUS | GPS FIX | WiFi | FIXED LOCATION | MOVING? | |
| 0 | 0 | 0 | 0 | 0 | DO NOTHING |
| 0 | 0 | 0 | 0 | 1 | DO NOTHING |
| 0 | 0 | 0 | 1 | 0 | DO NOTHING |
| 0 | 0 | 0 | 1 | 1 | REPORT ERROR |
| 0 | 0 | 1 | 0 | 0 | DO NOTHING |
| 0 | 0 | 1 | 0 | 1 | DO NOTHING |
| 0 | 0 | 1 | 1 | 0 | DO NOTHING |
| 0 | 0 | 1 | 1 | 1 | REPORT ERROR |
| 0 | 1 | 0 | 0 | 0 | DO NOTHING |
| 0 | 1 | 0 | 0 | 1 | DO NOTHING |
| 0 | 1 | 0 | 1 | 0 | DO NOTHING |
| 0 | 1 | 0 | 1 | 1 | REPORT ERROR |
| 0 | 1 | 1 | 0 | 0 | DO NOTHING |
| 0 | 1 | 1 | 0 | 1 | DO NOTHING |
| 0 | 1 | 1 | 1 | 0 | DO NOTHING |
| 0 | 1 | 1 | 1 | 1 | REPORT ERROR |
| 1 | 0 | 0 | 0 | 0 | DO NOTHING |
| 1 | 0 | 0 | 0 | 1 | DO NOTHING |
| 1 | 0 | 0 | 1 | 0 | DO NOTHING |
| 1 | 0 | 0 | 1 | 1 | REPORT ERROR |
| 1 | 0 | 1 | 0 | 0 | DO NOTHING |
| 1 | 0 | 1 | 0 | 1 | DO NOTHING |
| 1 | 0 | 1 | 1 | 0 | DO NOTHING |
| 1 | 0 | 1 | 1 | 1 | REPORT ERROR |
| 1 | 1 | 0 | 0 | 0 | DO NOTHING |
| 1 | 1 | 0 | 0 | 1 | DO NOTHING |
| 1 | 1 | 0 | 1 | 0 | DO NOTHING |
| 1 | 1 | 0 | 1 | 1 | REPORT ERROR |
| 1 | 1 | 1 | 0 | 0 | DO NOTHING |
| 1 | 1 | 1 | 0 | 1 | REPORT VIA CELLULAR |
| 1 | 1 | 1 | 1 | 0 | REPORT VIA WiFi |
| 1 | 1 | 1 | 1 | 1 | REPORT ERROR |

610

802 — ( START )

804 — RETRIEVE S, N

806 — RETRIEVE KNOWN PRIVATE KEY "K"

808 — GENERATE H = HMAC(K, N)

810 — GENERATE GROUP KEY G = XOR(S, H)

812 — RETURN GROUP KEY "G"

SYSTEM AND METHOD FOR DYNAMIC ASSET TRACKING AND MONITORING

CROSS-REFERENCE TO RELATED APPLICATIONS

This application claims priority benefit from U.S. Provisional Application No. 63/267,705, filed on Feb. 8, 2022. The patent application identified above is incorporated here by reference in its entirety to provide continuity of disclosure.

FIELD OF THE INVENTION

The field of the present invention is systems for tracking and monitoring palletized goods during transportation and storage.

BACKGROUND OF THE INVENTION

Pallets are the most popular method of shipping assets in the logistics industry worldwide. It is estimated that there are over 2 billion pallets in circulation in the United States, about 1.2 billion in China, and over 280 million in Europe. Each of the pallets, and the assets they support must be tracked and accounted for.

Pallets are typically constructed of wood or plastic. Wood pallets are generally damaged more easily than plastic pallets and so have a shorter useful lifetime. Plastic pallets are more resistant to damage but are typically more expensive than wooden pallets. Nevertheless, the cost of pallets is ever increasing. Therefore, pallet systems which rely on tracking and reuse of pallets are the most economically viable.

For many years, radio-frequency identification ("RFID") technology has been used to track pallets and the assets they contain. RFID is a passive technology that relies on a separate interrogation system to identify the location of the tags and the assets. More recently, global positioning satellite (GPS) technology has been employed to track palletized assets. GPS is an active technology which employs a transceiver attached to a shipping container and used to identify its location. Further, near-field communications and Bluetooth technology have been used to track palletized assets. Near field and Bluetooth communications are also active technologies that require power to transmit messages related to the position of the assets.

Each tracking technology has drawbacks. Active communication technologies which are incorporated into pallets all suffer from excessive power consumption and relatively short useful lifetimes. Replacing batteries, inductive charging, and pallet replacement are all expensive and time-consuming options which detract from the economic feasibility of actively tracked pallet systems. Likewise, passive technologies suffer the drawback of requiring active integration systems which makes them expensive to deploy and maintain.

The prior art has attempted to address these problems but has fallen short.

For example, U.S. Pat. No. 8,854,205 to Daniel, provides a system for countering terrorism by using a communication system network for tracking and monitoring containers as they travel over international seas. Daniel discloses monitoring devices which periodically activate themselves to record sensory information until a seaport is reached, whereupon the information is downloaded. A specially located monitoring device which has direct access to a satellite network is employed by other monitoring devices to transmit sensory information. However, Daniel provides no ability to reconfigure how the devices communicate depending on internal device health parameters. Therefore, the system exhibits the drawback of premature failure due to power consumption.

Another example is U.S. Publication No. 2007/0174148 to Schuler, et al. Schuler discloses a group of pallet devices, each associated with a pallet. The pallet devices are disclosed to communicate with RFID tags on assets and sensors to determine volume, weight and temperature. Each pallet device interacts with a database server through an interrogation system. Schuler discloses that one pallet device can communicate with another pallet device to determine whether or not a resource is missing. However, Schuler fails to consider power management or device health and so suffers the drawback of premature failure due to power consumption.

Another example is U.S. Publication No. 2016/0379165 to Moakley. Moakley discloses a system for tracking lost assets. Each asset is associated with an IOT device. Each IOT device communicates with an IOT gateway. The IOT gateway communicates with a centralized information system. The IOT gateways are typically mounted in transport vehicles such as trucks. The sensors periodically report to or "ping" the gateways. However, neither the IOT devices nor the gateways track or report internal health conditions of the IOT devices or the gateways. Therefore, Moakley fails to create a self-healing network. Further, the system fails to satisfactorily manage power consumption in the system as a whole, and therefore suffers the drawback of early failure.

Likewise, U.S. Publication No. 2020/01650322 to De Bokx, et al. discloses a system to be used with a group of pallets. Each pallet includes one of two types of tags, namely a "normal" tag and a "super" tag. The super tag forms a battery powered gateway through which the other tags communicate. The group of pallets must be carefully arranged before transport so that the super tag is on the outside. It must be on the outside so that it can communicate with a wireless network. Otherwise, the system fails. De Bokx further discloses that repeated periodic communication is required between the tags and the gateways thereby requiring excessive power use. The system fails to consider the internal health status of any tag during usage. Therefore, De Bokx suffers the drawback of potential loss of tracking information due to premature tag failure.

SUMMARY OF THE INVENTION

The invention is comprised of a self-constructed group of identical hubs, which extends the usable battery life of all hubs in the group by forming a self-healing network that eliminates unnecessary network traffic and assures communication integrity. The group communicates with a larger system which includes a server and various administrative devices that are used to monitor the location and status of the hubs and the palletized goods. Each hub is a stand-alone device that has a processor, memory, GPS transponder, various transceiver circuits, condition indicators, and a battery. Each hub is attached to a single pallet. The hubs are each capable of communication with the server through a variety of transceivers. However, only the hub that is determined by the group to be the best, communicates with the server at any one time.

Each hub is preferably physically encapsulated in a single plastic transport pallet. During shipment or storage, the pallets may be arranged in any order or physical location relative to the other pallets in the group. The hubs are connected to each other and the network preferably using short range radio signals, such as Wi-Fi, cellular, Bluetooth, or ultra-wideband ("UWB").

Each hub is further comprised of a plurality of sensors capable of detecting environmental conditions, such as movement, impact, the presence of light, temperature, and humidity. The hubs also include LEDs, to indicate hub status to the user.

Each hub is assigned a "rules table" by the server upon deployment. The rules table is a set of functions including instructions, variables, operators, and/or conditions which is stored in memory. Each rule in the table is used to trigger functions of the hub based on a comparison of an internal device "dynamic" of the hub to an external "dynamic" received from another hub.

A "dynamic" is a data structure stored in local memory that records certain types of data in a predefined and specific way designed to facilitate fast retrieval and use by the processor. The data includes the current physical state of the hub, parameters from the sensors and past reporting times, as will be further described. The data structure is addressable as a single memory block which must be addressed as a unit to save memory space and promote efficient computing.

During operation, each hub periodically receives dynamics from other hubs which transmit them. A comparison of the dynamic of the receiving hub to the other dynamics from the transmitting hubs allows each hub to carry out certain functions that create a "self-healing" network. The self-healing network is important because each hub considers both its own health and the health of all other hubs in the group before establishing a network connection with the server. As a result of self-selection, only the strongest hub connects to the server at any one time. As the strongest hub loses power, other hubs can (and do) replace it as the communication hub, thereby preserving battery life of the entire group of hubs, dynamically. In this way, the battery life of the group is greatly extended. In many cases, the hubs outlive the useful life of the physical pallets. This is a surprising result that drastically increases the economic value of the tracking system as a whole.

Each hub is also assigned a security profile to assure the integrity of the messaging that establishes the self-healing network. A security profile includes a cryptographic group key and private key. The group key identifies each hub in a group. Group keys and private keys are used to encode and decode messages sent by and received from each hub and the server. In a preferred embodiment, the group key is assigned to each hub in the group by the server. Both the group key and the private key are derived from a computationally efficient random number generator. The encoding and decoding functions are preferably conducted using a one-way hash function such as SHA-1, SHA-2 or MD5.

In one preferred embodiment, the rules table causes each hub to enter a "wait" state for an extended period of time if no messages are received and/or no signal is detected by the sensors. In the wait state, each hub stops all non-essential functions in order to conserve battery life. However, when the hub detects a stimulus, such as movement, it reactivates all non-essential functions and automatically executes corresponding instructions from the rules table. For example, the hub may attempt to connect with the server, write a set of conditions to memory, or activate an outward facing status indicator such as an LED.

In another preferred embodiment of the system, a group of hubs are present in the same location, in close proximity. As each hub automatically exits a wait state, it attempts to connect with a local area network, such as a Wi-Fi access points in a warehouse, or another hub in the hub group, as will be further described. If a Wi-Fi access point is unavailable, optionally the hub may automatically engage a cellular transceiver in an attempt to communicate with the server.

In all cases, when the system is in use, at least one hub periodically attempts to report to the server. The report includes many pieces of information about the health, position and status of the collective network of hubs. For instance, a report can indicate that an asset of the group has exceeded a critical temperature, pressure tolerance, light tolerance, humidity tolerance, impact tolerance or movement tolerance. Likewise, the location of the entire group may be reported using GPS coordinates.

In another preferred embodiment, the rules table may instruct the hub to change its network connection from Wi-Fi communications to cellular communications upon the loss of a Wi-Fi signal. In this way, when a group of pallets is shipped from one location to another, it can be tracked in transit using only one GPS transponder.

In yet another embodiment, each self-healing network of hubs automatically selects a number of hubs in the group, according to a predetermined match condition, to further assure communication integrity.

BRIEF DESCRIPTION OF THE DRAWINGS

FIG. 4B is a code segment showing a preferred dynamic memory structure.

FIG. 5D is a diagram of a preferred rules table.

DETAILED DESCRIPTION OF THE INVENTION

Figure 1A:
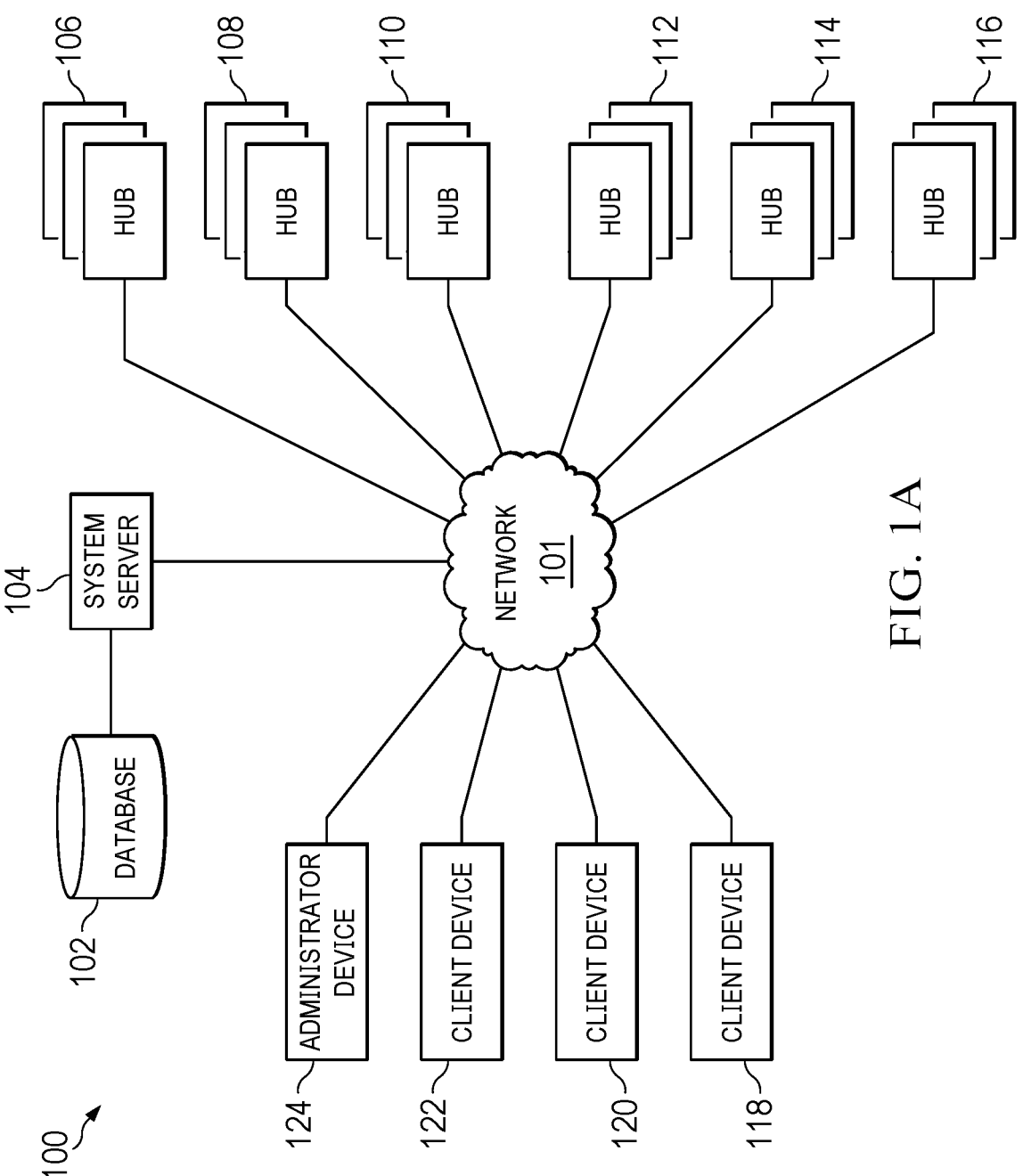
FIG. 1A is a system architecture diagram of a preferred embodiment of a system for tracking and monitoring goods.

Referring then to FIG. 1A, a preferred architecture of the system will be described. Unless otherwise specified, all tolerances and the use of the word "about" indicates ±20%.

System 100 comprises a plurality of hub groups such as hub groups 106, 108, 110, 112, 114, and 116. Each group is comprised of a number of identical hubs. At least one hub in each hub group is periodically in communication with network 101. Preferably the network is a wide area network such as the Internet, but of course can be other types of networks may be used. System server 104 communicates with each hub group, and each hub, through network 101 to send rules tables and receive periodic reports of hub group status. System server 104 is also operatively connected to database 102 and stores the rules tables and reports in the database.

Administrator device 124 is connected to system server 104 through network 101. In a preferred embodiment, the administrator device monitors the status of the hubs by receiving webpages generated by system server 104. Likewise, each of client devices 122, 120 and 118 is in communication with administrator device 124 and system server 104 through network 101. Each client device may receive reports and webpages from either administrator device 124 or system server 104 upon a properly authenticated request.

Preferably, the administrator device is a smart device, such as a computer, tablet or cell phone including a web application. Similarly, each client device is a smart device such as a computer, tablet or cell phone and includes a web application. The server is preferably a pooled centralized server resource that is accessed through the internet. The database is preferably MongoDB database platform available from MongoDB Inc. of New York, NY.

Figure 1B:
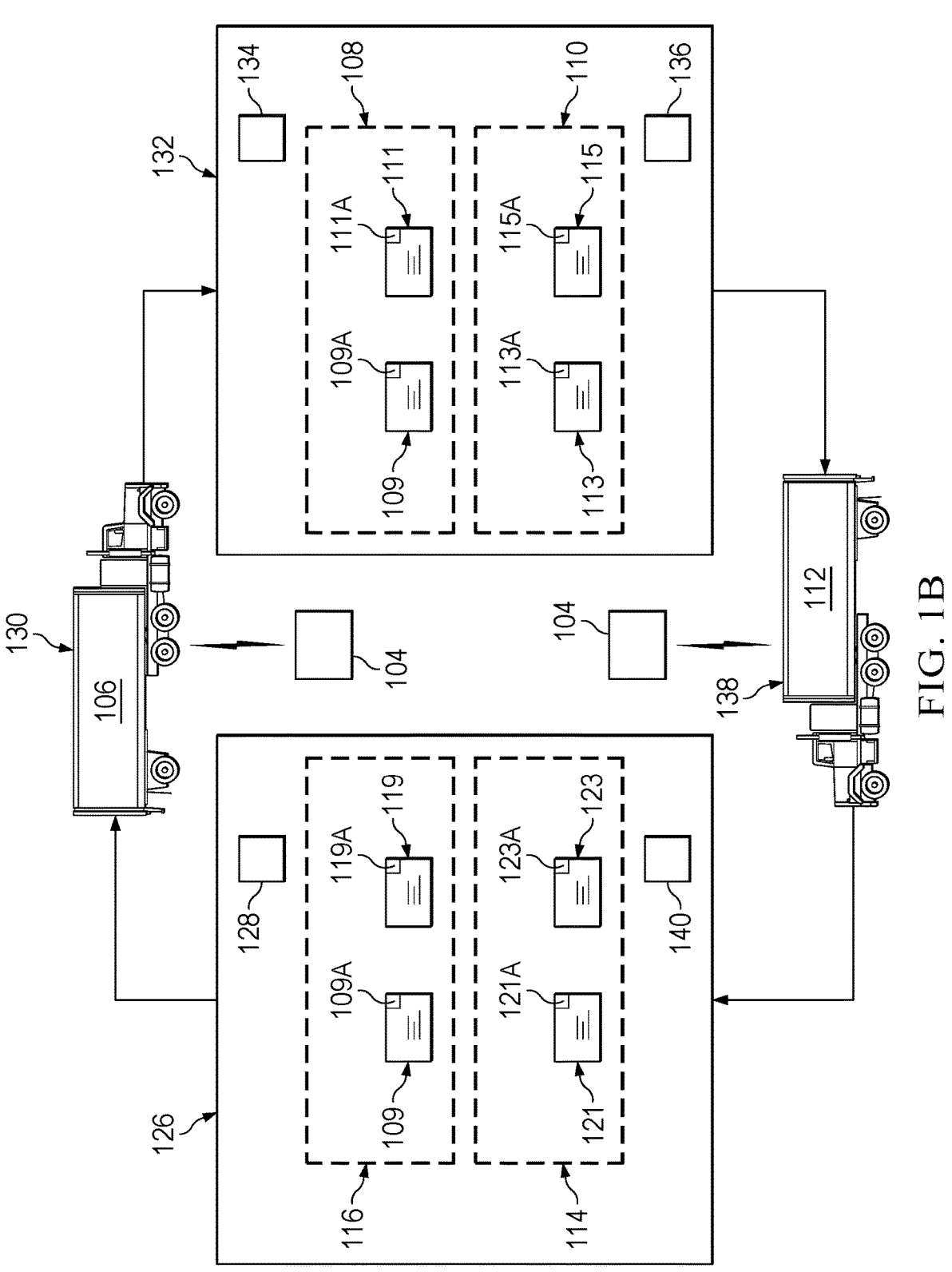
FIG. 1B is a conceptual drawing of a preferred usage of a system for tracking and monitoring of goods.

Referring then to FIG. 1B, a stylized flowchart of operation of the system in use will be further described.

In general, the system is used to monitor palletized assets, such as consumer goods, while in transit to and from various warehouses or storage locations.

For example, goods can be moved to and from warehouse 126 to warehouse 132 by trucks 130 and 138, respectively.

While in transit, truck 130 includes hub group 106. Likewise, truck 138 contains hub group 112. No set number of hub groups is required. No set number of hubs is required for a group. The hubs designate hub groups based on a predetermined number of dynamic "matches" and a predetermined RSSI signal strength of transmitting hubs. In this way, the number of hubs in a group is self-regulating, based on general parameters, as will be further described.

While in storage, pallets are also stored in hub groups. For example, hub group 108 includes pallet 109 and pallet 111. Each pallet incorporates a hub such as hubs 109A and 111A. Likewise, hub group 110 includes pallet 113 and pallet 115. Pallet 113 includes hub 113A. Pallet 115 includes pallet 115A. In the same way, hub group 116 includes pallet 109 and pallet 119. Pallet 109 includes hub 109A. Pallet 119 includes pallet 119A. Hub group 114 includes pallet 121 and pallet 123. Pallet 121 includes hub 121A. Pallet 123 includes hub 123A.

Each warehouse may include local Wi-Fi access points. For example, warehouse 126 includes Wi-Fi access points 128 and 140. Warehouse 132 includes Wi-Fi access points 134 and 136. In a preferred embodiment the Wi-Fi access points are located at ingress and egress points for each warehouse. For example, Wi-Fi access points 134 and 140 are located at the ingress points of warehouses 132 and 126, respectively. Wi-Fi access points 128 and 136 are located at egress point of warehouses 126 and 132, respectively. Each Wi-Fi access point is preferably model no. AMS-2111 Industrial 801.11b/g/n wireless LAN access point, available from Antaira Technologies, LLC of Brea, California, and properly configured to communicate with each of the hubs and the Internet.

When the hubs are located in the warehouses, in one preferred embodiment they communicate with system server 104 through one of the Wi-Fi access points. However, while in transit, one or more of the hubs communicate with system server 104 through a cellular or satellite based communications system.

Figure 2A:
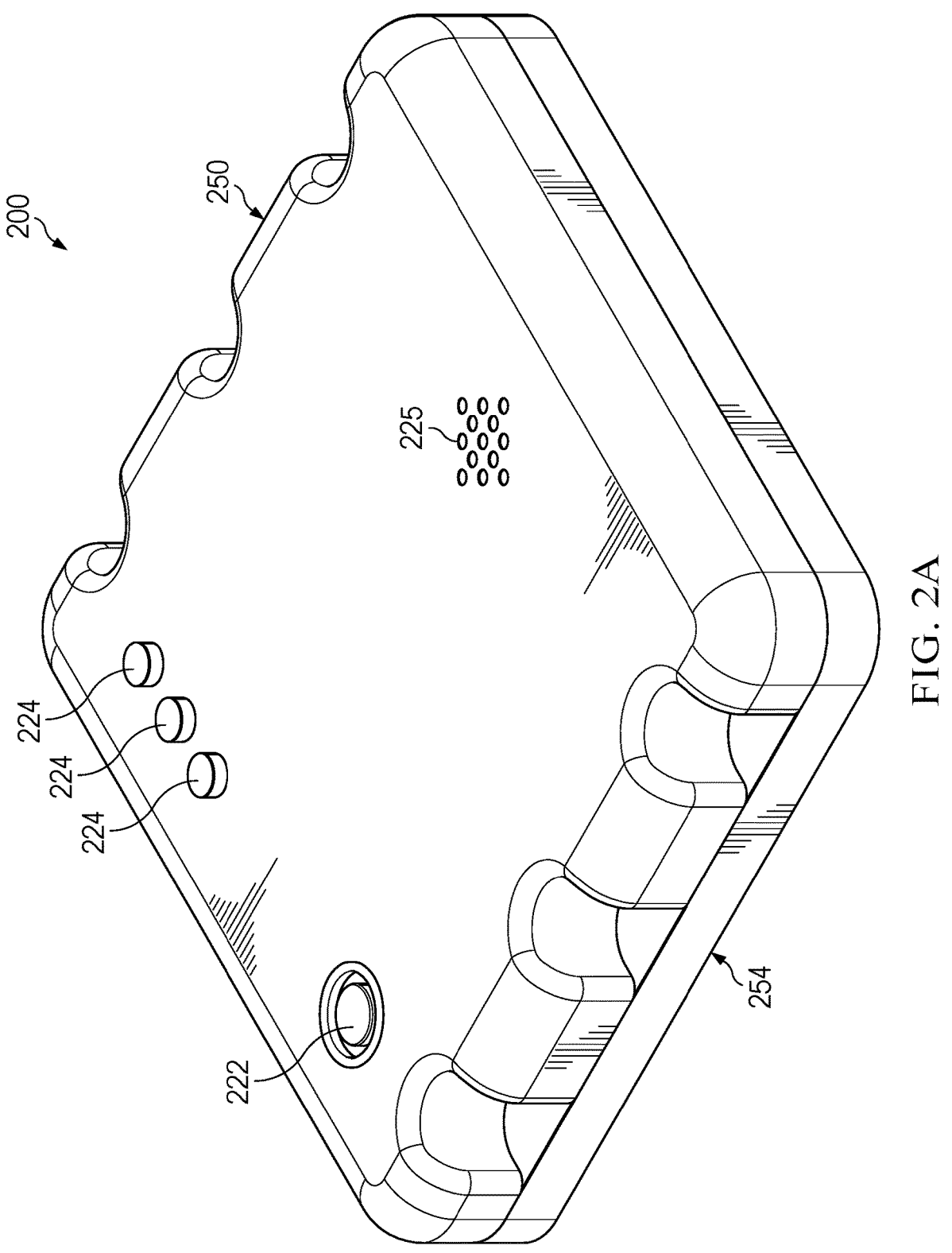
FIG. 2A is an isometric view of a preferred hub.

Referring then to FIG. 2A, a preferred external package of an example hub will be further described. External package 200 includes top 250 sealed to bottom 254. Both top 250 and bottom 254 are preferably formed from a durable plastic, such as HDPE, Teflon, or Delrin. Top 250 includes activation button 222 and externally visible LEDs 224. Activation button 222 is used to activate the hub, as will be further described. LEDs 224 are used to indicate internal system status, as will be further described. Top 250 further includes hole pattern 225. Hole pattern 225 is used to communicate external environmental conditions to various sensors, as will be further described.

Figure 2B:
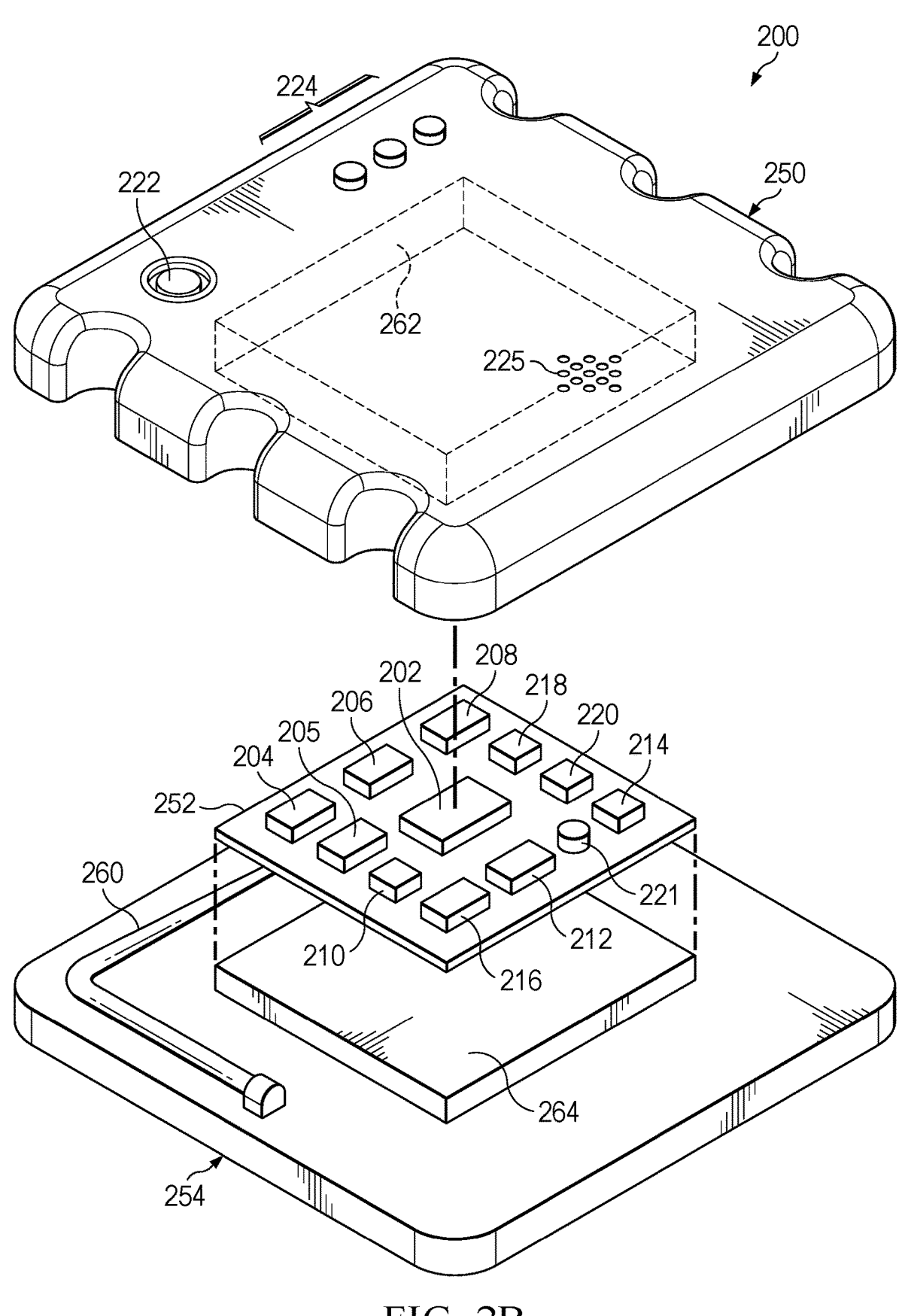
FIG. 2B is an exploded isometric view of a preferred hub.
Figure 2C:
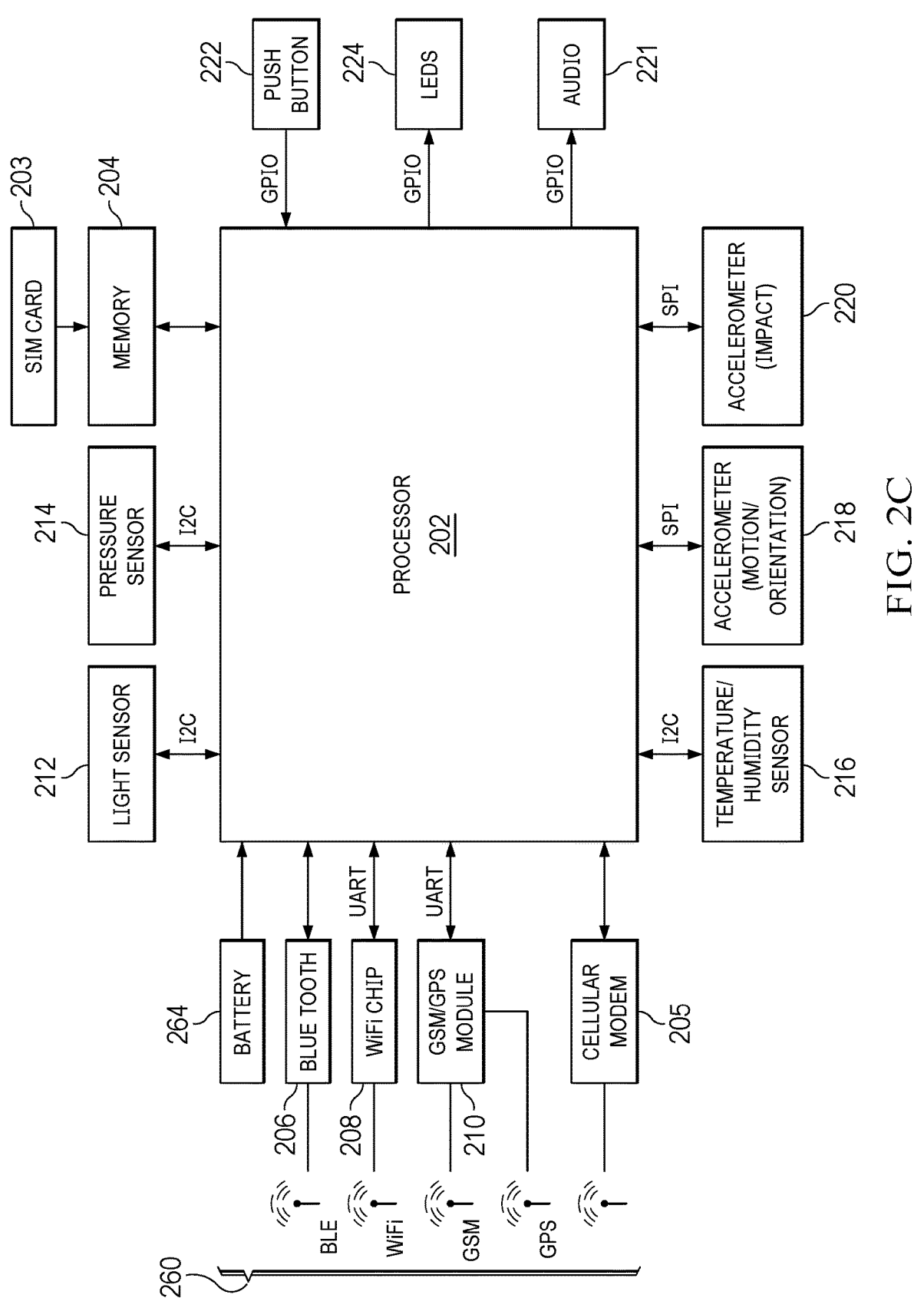
FIG. 2C is an architecture diagram of a preferred hub.

Referring then to FIGS. 2B and 2C, a preferred hub will be further described.

Top 250 includes internal rectangular void 262. PC board 252 is positioned in void 262 and preferably encapsulated during manufacture by an epoxy resin. Bottom 254 is attached to top 250 by a permanent industrial adhesive which hermetically seals PC board 252 in void 262.

PC board 252 further comprises processor 202. In a preferred embodiment, processor 202 is part number NRF 52840 available from Nordic Semiconductor ASA of Trondheim, Norway.

Processor 202 is operatively connected to memory 204. In one embodiment, processor 202 includes both internal memory, and removable memory such as SIM card 203 which is installed before the unit is assembled.

Processor 202 is also operatively connected to Bluetooth transceiver 206, Wi-Fi transceiver 208, and GSM/GPS module 210 through UART connections. Processor 202 uses Bluetooth transceiver 206, Wi-Fi transceiver 208 and GSM/GPS module 210 receive and communicate various status signals to the system server and the hubs, as will be further described. Bluetooth transceiver 206 is preferably provided in part no. NRF52840 along with processor 202.

In a preferred embodiment, GSM/GPS module is part number BG95-M3 available from Quectel Wireless Solutions Co., Ltd. of Shanghai, China. The GSM/GPS module provides a maximum data rate of approximately 588 KBPS down link and 1,119 KPS uplink using ultralow power consumption available from the ARM Cortex-M4 processor.

Wi-Fi transceiver 208 is preferably part number ESP 8266 available from Espressif Systems of Shanghai, China. Wi-Fi transceiver 208 provides a highly integrated Wi-Fi MCU suitable for low power applications including an integrated TCP/IP protocol stack accessible by the processor.

Each of Bluetooth transceiver 206, Wi-Fi transceiver 208 and GSM/GPS module 210 are operatively connected to antenna stack 260 which, preferably, is rigidly fixed to bottom 254.

PC board 252 further includes light sensor 212, pressure sensor 214, and temperature sensor 216. Each of these sensors is operatively connected to processor 202 through a I2C connection and has access to external environmental conditions through hole pattern 225.

Temperature sensor 216 is preferably part number ENS 210 available from ScioSense B.V. of Eindhoven, the Netherlands. Temperature sensor 216 provides a digital output of relative humidity and temperature.

Light sensor 212 is preferably part number VEML6040 available from Vishay Intertechnology, Inc. of Malvern, Pennsylvania. Light sensor 212 preferably is an RGBW color sensor measuring the intensity of red, green, and blue ambient light condition and provides a broad spectrum photo diode for sensing low level white light.

Pressure sensor 214 is part number LPS22HB available from STMicroelectronics. The pressure sensor is a piezoresistive pressure sensor, which functions as a digital output barometer, which has an absolute pressure range between 260 hPa and 1260 hPa and is capable of low power operation.

Processor 202 is further connected to motion and orientation accelerometer 218 and impact accelerometer 220 through an SPI connection. The accelerometers are used to determine movement and position of the hub, as will be further described.

Motion and orientation accelerometer 218 is preferably part number LIS3DH available from STMicroelectronics N.V. of Geneva, Switzerland. Motion and orientation accelerometer 218 is a 3-axis MEMS accelerometer which preferably is set at ±2 G sensitivity and capable of measuring accelerations with output data rates from 1 Hz to 5.3 kHz including interrupt signals which are used to indicate initial start-up and free fall events. Impact accelerometer 220 is also provided by part number LIS3DH available from STMicroelectronics.

Power is provided to the various components of the PC board by battery 264. In one embodiment, battery 264 is a rectangular lithium ion polymer battery pack rated at 4.2 V and 2200 mAh, part number 18650, available from Shenzhen Gmcell Technology Co., Ltd. of Shenzhen, China and is encapsulated in epoxy along with the PC board during manufacture.

PC board 252 further includes cellular modem 205 operatively connected to processor 202 through a UART connection. In a preferred embodiment, cellular modem 205 is part number NL-SWN-LTE-NRF9160-B available from Airgain, Inc. of San Diego, California.

Processor 202 is also operatively connected to activation button 222, piezo electric speaker 221 and LEDs 224 through separately addressable GPIO pins.

Figure 3:
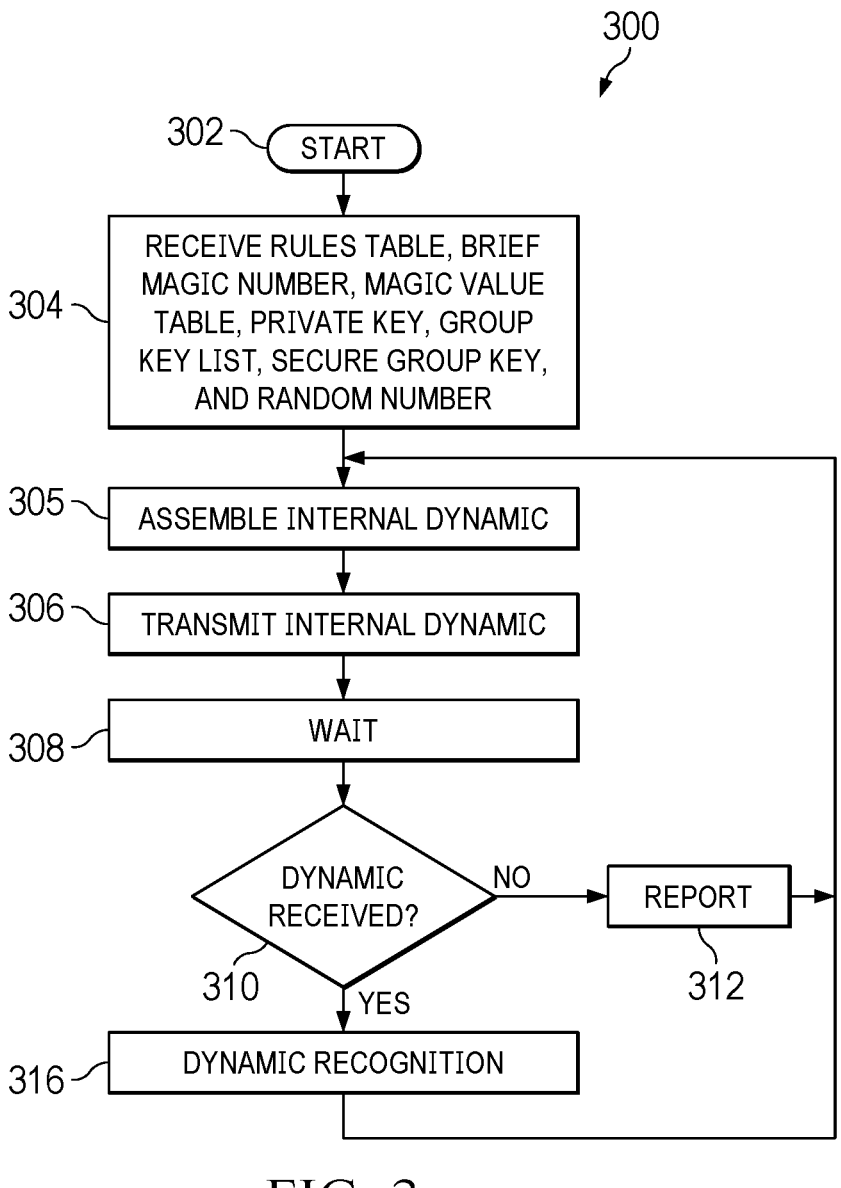
FIG. 3 is a flow chart of a preferred run state for a hub.

Referring then to FIG. 3, preferred method 300 of run state operation of each hub will be further described. Preferably, the instructions for the run state are stored in local memory of the processor and are available to the processor at boot up. Boot up is activated by depressing activation button 222.

At step 302, the method begins.

At step 304, processor 202 receives at least one rules table and, optionally, a secure group key, a brief magic number, a magic value table, private key, group key list and random number from the server and stores them in local memory, as will be further described. The rules table, secure group key, brief magic number, magic value table, private key, group key list and random number may also be transmitted to local memory through a debug UART or may be included on the SIM card.

At step 305, the processor assembles an internal dynamic, as will be further described.

At step 306, the processor broadcasts the internal dynamic preferably using the Bluetooth transceiver. The processor may also broadcast the internal dynamic using the Wi-Fi transceiver.

At step 308, the processor waits state until either a "timeout" condition or a "trigger" condition is received. In the wait state all processor functions but for the interrupt channel and the clock are placed in a dormant condition to conserve power. In a preferred embodiment, the timeout condition returns true after 24 hours. Other time periods may be specified. In a preferred embodiment, a trigger condition is an interrupt from impact accelerometer 220 or motion orientation accelerometer 218, as will be further described.

At step 310, the processor polls the Bluetooth transceiver to determine whether or not a dynamic has been received from another hub. If so, the method moves to step 316. If not, the method moves to step 312.

At step 312, the hub reports to the server, as will be further described. The method then returns to step 306.

At step 316, the processor executes a dynamic recognition routine, as will be further described. The server then returns to step 306.

The run state continues until an interrupt is received from the server or from the push button, as previously described.

Figure 4A:
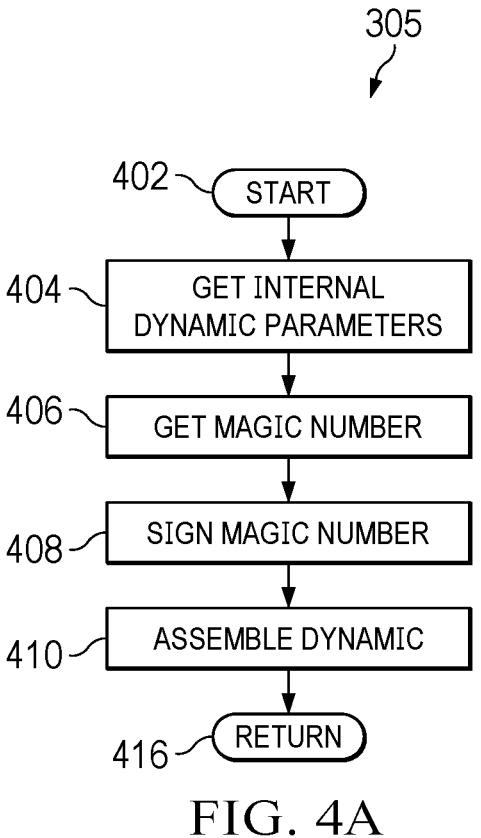
FIG. 4A is a flowchart of a preferred transmit dynamic method.

Referring then to FIG. 4A, a preferred method of assembling and transmitting a dynamic, as described in step 305, will be further described.

At step 402, the method begins.

At step 404, the processor retrieves a set of internal dynamic parameters. In one embodiment, the processor retrieves the internal dynamic parameters from the battery pack, the GPS transceiver, the Wi-Fi transceiver, the cellular transceiver and each of the sensors. The data is stored in an encapsulated message format (known as the "dynamic" or "dynamic memory structure") that is comprised of 32 bytes of payload. Preferably, the payload includes 2 bytes for a dynamic ID, and 1 byte for a value indicating the elapsed time since the last report to the server. The payload also includes 1 byte which indicates the RSSI signal strength of the hub. The payload further comprises 2 bits to indicate battery status. Preferably "00" is designated as critically low, "01" is designated as low, "10" is designated as satisfactory, and "11" is designated as high power. The payload further comprises a single bit indicating whether or not the hub has a GPS fix, reporting 1 for true, and 0 for false. Likewise, the payload comprises a Wi-Fi signal present indicator of 1 bit, reporting 1 for true, and 0 for false. The payload further comprises 1 bit to indicate whether or not the location of the hub is fixed, reporting 1 for true, and 0 for false. The payload further comprises 1 bit to indicate whether or not the hub is moving, 1 for true and 0 for false. 6 bytes of the payload are reserved for a device ID of the hub and are transmitted as a MAC address. Each payload also includes a 5 byte sequence number of the hub. The payload further comprises a group signature of 8 bytes, which is a hash based method authentication code (HMAC) group key, and 8 bytes for a device signature, which is an HMAC private key, as will be further described. 1 byte is reserved for a "brief magic" parameter, which is used to reduce search space and provide decoding efficiency, as will be further described. Other internal dynamic parameters may also be included such as longitude and latitude coordinates from the GPS transceiver. Of course, other sizes of payload may be used, as well as other encapsulating memory structure arrangements.

At step 406, the method retrieves its brief magic number from memory.

At step 408, the processor mathematically "signs" the brief magic number, creating an electronic signature for it.

In one preferred embodiment, the digital signature is based on RSA. An RSA key pair is generated containing a module, N, that is the product of two random distinct large primes, along with integers, e and d, such that:

$$e \times d = 1 \pmod{\varphi(N)}$$

where:

$\varphi$ is Euler's totient function;

N and e are the public key of the transmitting hub; and d is the secret key of the transmitting hub.

To sign a message, m, the transmitting hub computes a signature, a, such that:

$$\sigma = m^d \pmod{N}$$

where:

$m^d$ is a modular exponentiation operation; and m is the message, preferably the message is the brief magic number.

At step 410, the processor assembles the dynamic for transmission by importing the required variables and data from memory into the dynamic memory structure.

At step 416, the processor returns.

Referring then to FIG. 4B, a preferred example of code for encapsulating a dynamic memory structure will be further described.

The code "encapsulates" the data by a unique combination of "C" statements that include both the "union" instruction and the "struct" instruction. The combination is important because it allows the dynamic to be compactly stored and retrieved as a single unit that is made up of individually addressable smaller units. Of course, other parameters and variables, such as longitude and latitude coordinates may be included.

Line 5 invokes the "union" instruction to encapsulate the dynamic parameter in memory. Union is a user defined data type which allows a combination of objects of different types and sizes and allocates memory space equal to the space to hold the largest data elements included. The union instruction requires that the data structure be accessed as a whole.

As can be seen in line 6, encapsulation method also uses the "struct" user defined data type that also combines logically related data items of different types. All structure elements are stored in contiguous memory location for speed and ease of access. The "struct" instruction allows individual access to the data elements.

Lines 10 through 12 are variable designations for the sequence number of the device, humidity and temperature.

At lines 13 through 17, data from the motion and orientation accelerometer 218 is packed into a single variable "orientation."

At line 18, the extreme high (or low) temperature, which has been experienced by the temperature sensor is recorded.

At line 19, the "match" parameter is assigned a variable name of "sample count."

At line 20, an unsigned integer memory space is assigned for the brief magic parameter.

At lines 21 through 27, the packed variable "variant7" can be seen to include the magic value, the signature of the device, the current battery level, and the current report of temperature from the temperature sensor.

At line 28, the dynamics packet format can be seen. Lines 30 and 31 include the sequence number of the device, and a unique number assigned to the dynamic.

At lines 32 through 38, a single data structure named "context" is encapsulated, which include variables, integer variables for the battery status, the GPS fix, the Wi-Fi fix, the fixed location, and the moving variables as previously described.

At lines 39 through 42, a packed data structure is assembled which includes the device signature and the group signature. These are the private and public keys, as previously described.

At line 43, at the last report time is assigned a variable name of last report time. At line 44, a variable is assigned for brief magic. The data structure is encapsulated at lines 28 through 45 and assigned a variable name "variant8."

Figure 4C:
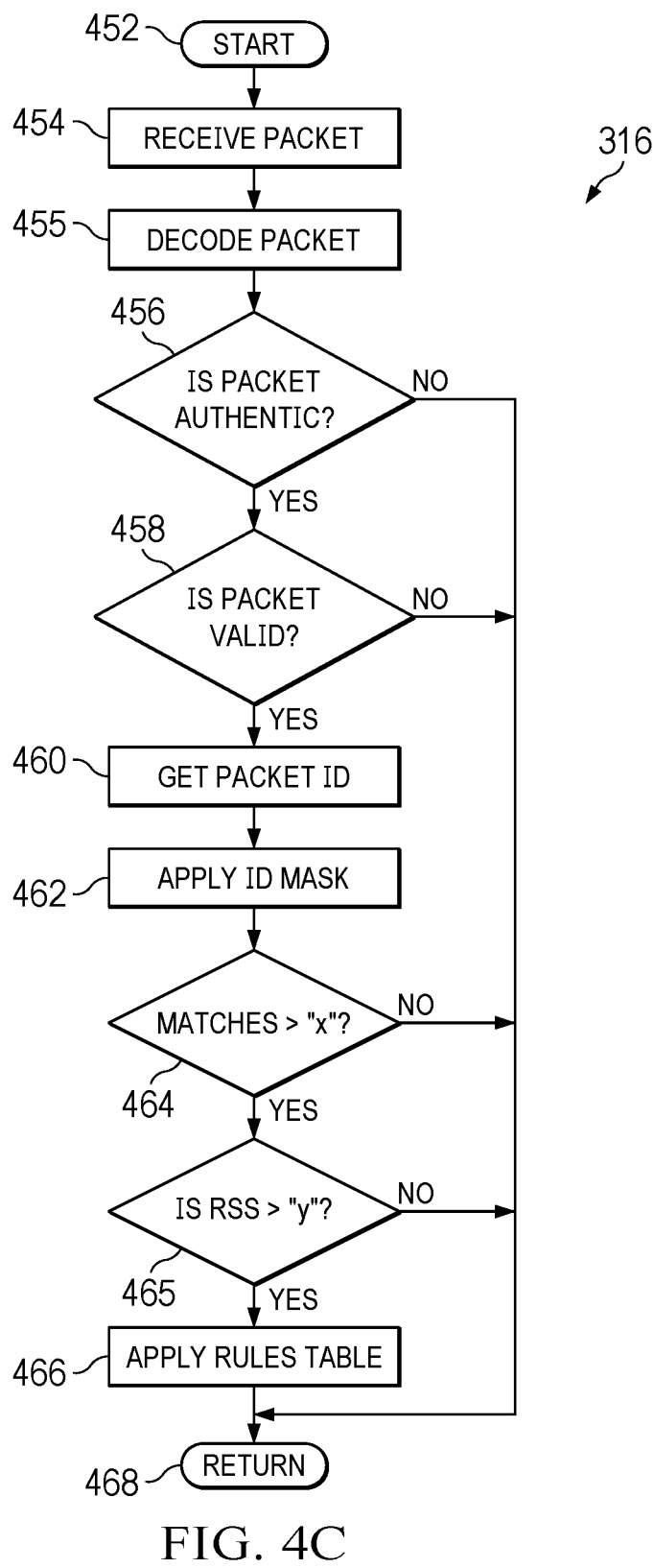
FIG. 4C is a flowchart of a preferred dynamic recognition routine implemented by a hub.

Referring then to FIG. 4C, preferred method of dynamic recognition, as described in step 316, will be further described.

At step 452, the method begins.

At step 454, the processor receives a dynamic packet from one or more of the transceivers, preferably the Bluetooth transceiver.

At step 455, the processor decodes the dynamic packet cryptographically, as will be further described.

At step 456, the processor determines whether or not the packet type is authentic. In one preferred embodiment, the packet type is judged authentic if it has the appropriate ID and is the proper length, 32 bytes. Other preferred methods of authentication will be further described. If so, the processor moves to step 458. If not, the processor moves to step 468.

At step 458, the processor determines whether or not the packet is valid. In a preferred embodiment, the packet is judged valid if it has the appropriate signature and the appropriate sequence number. Other preferred methods of validation will be further described. If so, the method moves to step 460. If not, the method moves to step 468.

At step 460, the method isolates the packet ID. At step 462, the processor applies an ID mask. In a preferred embodiment, the ID mask is applied to the dynamic to remove parameters from consideration that are not necessary for the dynamic recognition process, such as sensor parameters. Use of the ID mask is important because it speeds processing and reduces memory usage.

At step 464, the processor determines whether or not the number of unique dynamics received or "matches," exceeds a predetermined threshold. In preferred embodiment the minimum number of matches required is 10. But other numbers may be used and groups of over 1,000 matches are typical. The match parameter is important because it is used to determine whether or not the hub is among a sufficiently large group of hubs so that a self-healing network may be efficiently implemented. Groups of sufficient size are typically found in a group of pallets located in a warehouse or a group of pallets located on a truck. If so, the processor moves to step 465. If not, the external dynamic may be erased, and the method moves to step 468.

At step 465, the processor retrieves the received signal strength ("RSSI") parameter related to the received dynamic. If the RSSI parameter is above a preset threshold, then the method moves to step 466. If not, the external dynamic maybe erased, and the method moves to step 468. In a preferred embodiment, the preset threshold is between about −70 dB and about −40 dB, indicating a signal strength of between about 60% and about 80%. In this way, the hub automatically sets the number of hubs that qualify for group status. In short, only a certain finite number of hubs can generate a sufficient RSSI signal to be included.

At step 466, the processor compares its internal dynamic parameters to the parameters in a received dynamic, in order to carry out certain functions according to a rules table, as will be further described.

At step 468, the method returns.

Figure 5A:
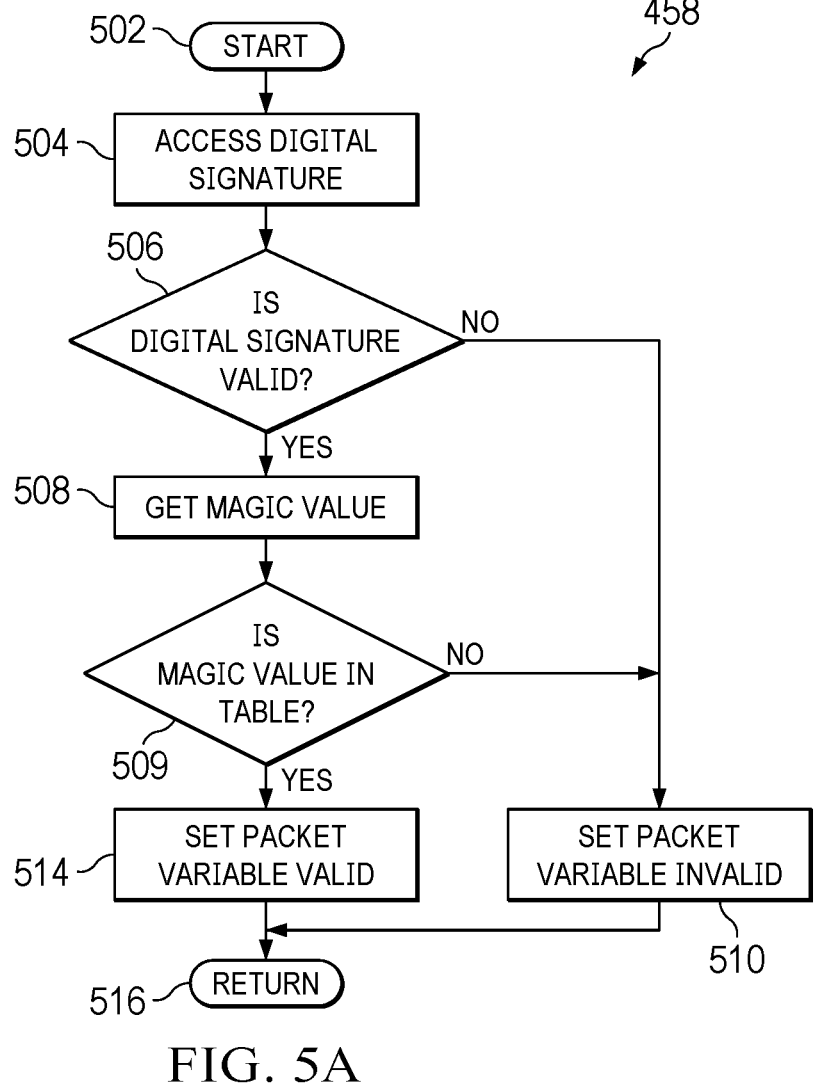
FIG. 5A is a flowchart of a preferred method of packet validation.

Referring then to FIG. 5A, a preferred method of determining whether or not a packet is valid, as described in step 458, will be further described.

At step 502, the method begins.

At step 504, the processor retrieves the digital signature from the union statement associated with the magic number value in the dynamic memory structure.

At step 506, the processor determines whether or not the digital signature is valid. In a preferred embodiment, to verify the signature, the receiving hub verifies that the following equation is valid.

$$\sigma^e = m(\text{mod } N)$$

where:

σ is the digital signature;

e is a public key integer;

m is the message, preferably the brief magic number; and N is a public key integer.

If the digital signature is valid, the method moves to step 508. If the digital signature is not valid the method moves to step 510.

At step 508, the processor retrieves the magic value from the received dynamic.

At step 509, the processor compares the magic value from the received dynamic to the magic value table stored memory. If the magic value from the received dynamic is not in the table, then the method moves to step 510. If the magic value from the received dynamic is in the magic value table, then the method moves to step 514.

At step 510, the processor sets a packet variable to "packet invalid" and moves to step 516.

At step 514, the processor sets the packet variable to "packet valid" and moves to step 516.

At step 516, the processor returns the packet variable.

Figure 5B:
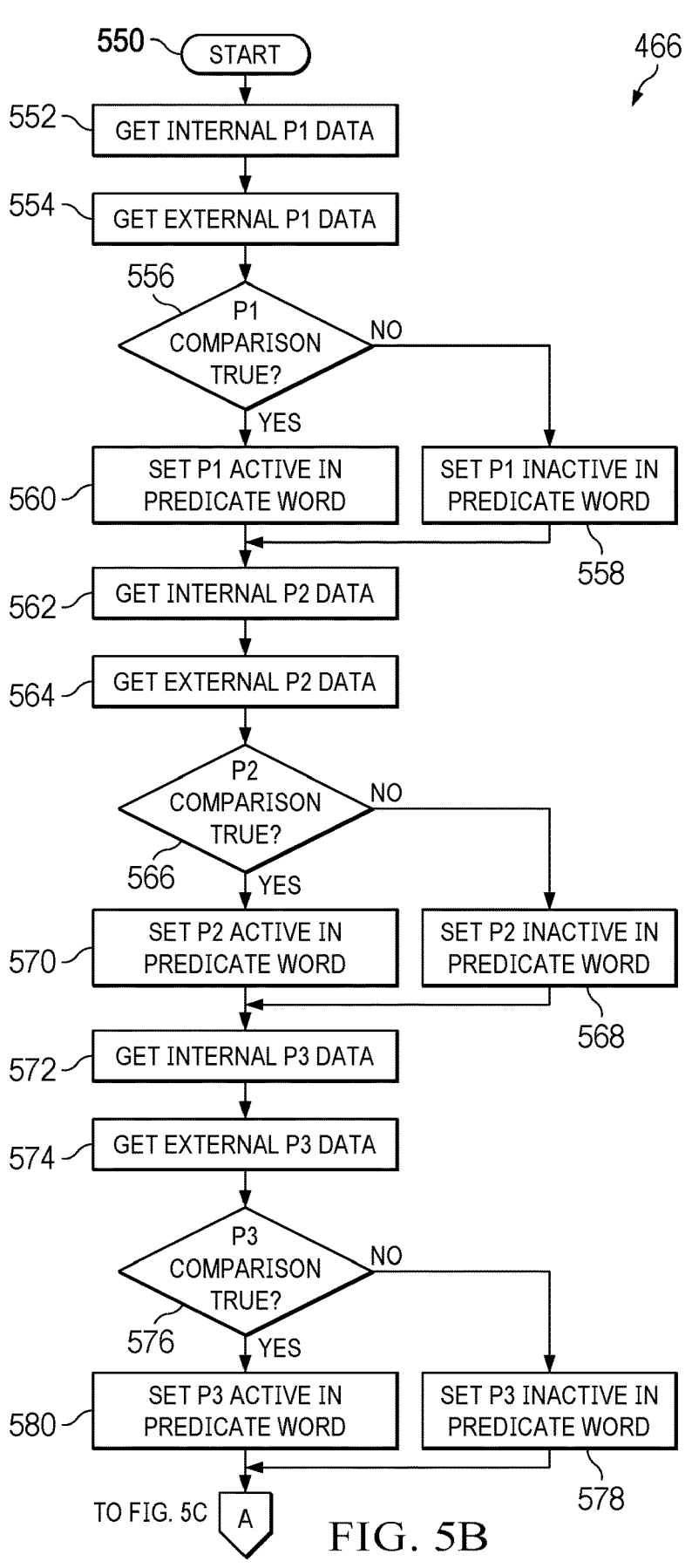
FIGS. 5B and 5C show a flowchart of a preferred method of execution of an example rules table by a hub.
Figure 5C:
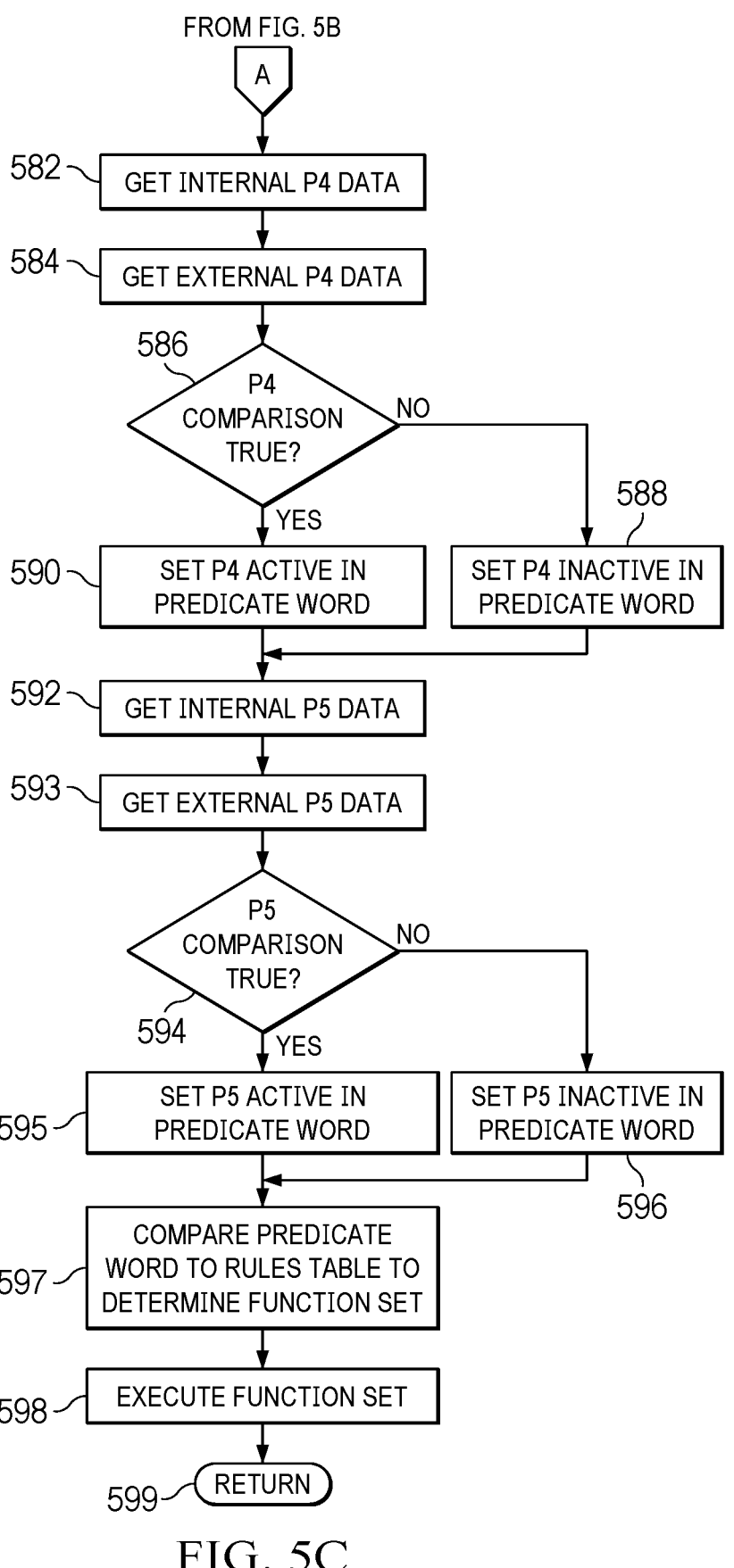

Referring to FIGS. 5B and 5C, a method of execution of an example rules table, as described in step 466, will be further described. In general, the processor assembles a 5 bit predicate word from 5 different comparisons of predicate data P1-P5. The predicate data is retrieved from the internal dynamic of the receiving hub and the internal dynamic of the transmitting hub. The predicate word is then compared to a table which specifies an individual set of instructions for the processor depending on the value of the predicate word. Of course other lengths of the predicate word and other parameters for the predicate data may be used.

At step 550, the method begins.

At step 552, the processor retrieves internal P1 data. At step 554, the processor retrieves external P1 data. In this example, internal P1 data is the battery status of the receiving hub and the external P1 data is the battery status of the transmitting hub.

At step 556, the processor determines whether or not a comparison of the internal P1 data to the external P1 data is true. In this example, the comparison is determined to be true if the numerical value of the battery status of the receiving hub is greater than the numerical value of battery status of the transmitting hub. If the comparison returns true, the processor moves to step 560. If the comparison returns false, the processor moves to step 558.

At step 560, the processor sets the P1 bit active in the predicate word and moves to step 562.

At step 558, the processor sets the P1 bit inactive in the predicate word and moves to step 562.

At step 562, the processor retrieves the internal P2 data. At step 564, the processor retrieves the external P2 data. In this example, the internal P2 data is 1 if the receiving hub does has a GPS fix and 0 if not. Likewise, the external P2 data is 1 if the transmitting hub has a GPS fix and 0 if not.

At step 566, the processor compares the internal P2 data to the external P2 data to determine whether or not the comparison returns true. In this example, the P2 comparison returns true if the receiving hub has a GPS fix and the transmitting hub does not have a GPS fix (1,0). The comparison returns false if neither the receiving hub nor the transmitting hub have a GPS fix (0,0), if the receiving hub has no GPS fix and the transmitting hub has a GPS fix (0,1), and when both the receiving hub and the transmitting hub have a GPS fix (1,1).

At step 570, the processor sets the P2 bit in the predicate word to active and moves to step 572.

At step 568, the processor sets the P2 bit inactive in the predicate word and moves to step 572.

At step 572, the processor retrieves the internal P3 data value. At step 574, the processor retrieves the external P3 data value. In this example, the internal P3 data is 1 if the receiving hub has a Wi-Fi signal and 0 if not. Likewise, the external P3 data is 1 if the transmitting hub has a Wi-Fi signal and 0 if not.

At step 576, the processor makes a comparison between the internal P3 data and the external P3 data to determine whether or not the condition returns true. In this example, the comparison returns true if the receiving hub has a Wi-Fi signal and the transmitting hub does not have a Wi-Fi signal (1,0). The comparison returns false if neither the receiving hub nor the transmitting hub has a Wi-Fi signal (0,0), if the receiving hub does not have a Wi-Fi signal and the transmitting hub has a Wi-Fi signal (0,1), and when both the receiving hub and the transmitting hub have a Wi-Fi signal (1,1).

If the comparison is true, the processor moves to step 580. If the condition is false, the processor moves to step 578.

At step 580, the processor sets the P3 bit active in the predicate word and moves to step 582.

At step 578, the processor sets the P3 bit inactive in the predicate word and moves to step 582.

At step 582, the processor retrieves the internal P4 data. At step 584, the processor retrieves the external P4 data.

In this example, the internal P4 data is indicative of whether or not the receiving hub is in a fixed location. In this example, the processor determines whether or not the receiving hub is in a fixed location by retrieving a bit set in the rules table at startup. The bit is set to 1 if the hub is permanently fixed to a stationary object, like a wall. If not, the internal P4 data returns a 0. Likewise, the external P4 data is set to reflect a 1, if the transmitting hub is in a fixed location and 0 if not.

At step 586, the processor determines whether or not the P4 comparison is true. In this example, the P4 comparison returns true only if the internal P4 data is 1 and the external P4 data is 0, (1,0), indicating that the receiving hub is fixed and the transmitting hub is capable of moving. The P4 comparison returns false if the internal P4 data and the external P4 data are both 0, (0,0), indicating that neither the receiving hub nor the transmitting hub is in a fixed location, if the external P4 data is 1, indicating that the receiving hub is capable of moving, but the transmitting hub is in fixed location, (0,1), and if both the internal P4 data and the external P4 data are 1, (1,1), indicating that both the receiving hub and the transmitting hub are fixed. If the P4 comparison returns true, the method moves to step 590. If the P4 condition returns false, the process moves to step 588.

At step 590, the processor sets the P4 bit in the predicate word active and moves to step 592.

At step 588, the processor sets the P4 bit inactive in the predicate word and moves to step 592.

At step 592, the processor retrieves the internal P5 data. At step 593, the processor returns the internal P5 data.

In this example, the internal P5 data is indicative of whether or not the receiving hub is capable of moving. The internal P5 data is determined by the receiving hub by polling both the impact accelerometer and the motion accelerometer to determine if movement is present. If movement in either or both accelerometers is present, internal P5 data is set to 1. If movement is not present in either accelerometer then the internal P5 data is set to 0. Likewise, the external P5 data is set to 1 if the transmitting hub has determined it is moving and 0 if not.

At step 594, the processor makes a comparison between the internal P5 data and the external P5 data. In this example, the P5 comparison returns true if the internal P5 data and the external P5 data are both set to 1 (1,1), indicating that both the receiving hub and the transmitting hub are moving. The P5 comparison returns false if both the internal P5 data and the external P5 data are 0 (0,0), indicating that neither hub is moving, and when either the internal P5 data or the external P5 data is 0, indicating that at least one of the hubs is not moving (0,1), (1,0). If the P5 comparison returns true, then the process moves to step 595. If the P5 comparison returns false, processor moves to step 596.

At step 595, the processor sets the P5 bit in the predicate word active and moves to step 597.

At step 596, the processor sets the P5 bit inactive in the predicate word and moves to step 597.

At step 597, the processor compares the predicate word to the rules table to determine a function set, as will be further described.

At step 598, the processor executes the function set, as will be further described.

At step 599, the processor returns.

Referring then to FIG. 5D example rules table will be further described. In general, each rules table comprises a series of sets of instructions, or "function sets" which correspond to different values of the predicate word. The memory may contain many different versions of the rules table and may be recalled for used by different cryptographic rules keys, as will be further described. In this way, the server can control the behavior of each group of hubs by merely choosing a different group key and sending it to the memory in each hub when each hub is initialized. This feature is important because it allows the hub to be reused with different types of assets, with different types of potential transport, environmental and error requirements. For each combination of active and inactive settings the bits of the predicate word, the function set includes an appropriate set of instructions. The function sets may include, as examples, instructions to retrieve the status of one or more sensors, activate or deactivate one or more transceivers, and to activate or deactivate warning indicators such as colored LEDs or a beeper. The instructions may also include logical operations to compare the values of variables from the sensors or transceivers and execute various functions. For example, if a certain maximum or minimum temperature has been exceeded a red LED may be activated. In another example, if battery status indicates (1,1) a green LED may be activated. In yet another embodiment, a report may be generated and transmitted for an internal error condition, such as when both the "fixed location" bit and the "moving?" bit are both set to 1, (1,1) in the predicate word, which is a condition that should never occur. Of course, many other functions sets are possible.

In this example, the predicate word is a 5 bit word, which indicates battery status at P1, GPS fix at P2, Wi-Fi at P3, a fixed location at P4 and a moving status at P5. As can be seen in this example for most predicate word values, the function set returns a "do nothing" instruction. The "do nothing" instruction instructs the processor to take no action and return to the wait state. However, when the predicate word has value 11101, the function set requires that the processor report system status to the system server via a cellular connection. Likewise, when the predicate word has value 11110, the function set requires that the processor report system status to the system server via a Wi-Fi connection. When the predicate word takes on values 00011, 00111, 01011, 01111, 10011, 10111, and 11011, the function set requires the processor to report an error condition.

As the example rule table demonstrates, in most conditions indicated by the predicate word, the processor takes no activity and thereby conserves battery power. An exception is when each of the last 2 bits is set to 1, in which case an error condition is reported. The rules table also indicates that when the hub determines its predicate word is 11110 or 11101, then it is the "strongest" hub in the group and so will report to the server on behalf of the entire group.

Figure 6:
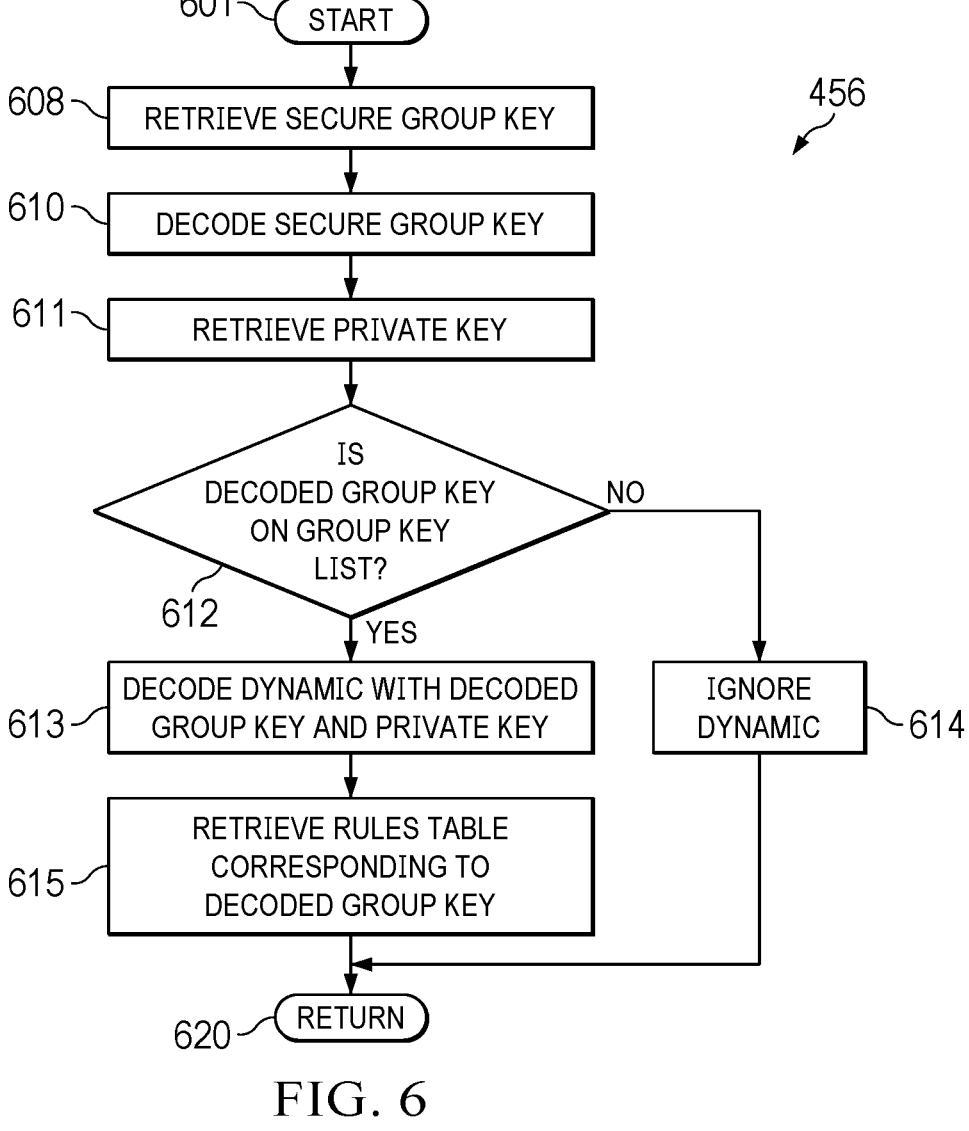
FIG. 6 is a flowchart of a preferred packet authentication method.

Referring then to FIG. 6, the preferred method of authenticating a packet, described at step 406, will be further described.

At step 601, the method begins.

At step 608, the processor retrieves the secure group key from memory.

At step 610, optionally, the secure group key is decoded, as will be further described.

At step 611, the processor retrieves the private key from memory.

At step 612, the processor determines whether or not the decoded group key is on the group key list. If not, the method moves to step 614. If so, the method moves to step 615. If not, the method moves to step 614.

At step 613, the processor decodes the packet with the decoded group key and the private key.

At step 614, the processor ignores the packet, clears it from memory, and moves to step 620.

At step 615, the processor retrieves the rule table for memory which corresponds to the decoded group key.

Figure 7:
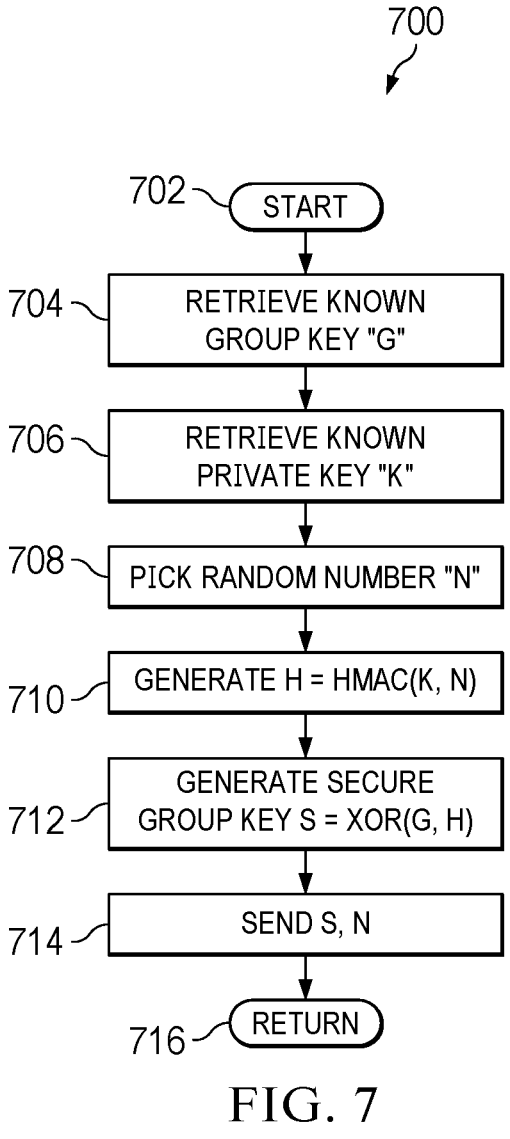
FIG. 7 is a flowchart of a preferred encode group key method.

Moving to FIG. 7, a preferred method of encoding a secure group key will be further described. In a preferred embodiment, method 700 is carried out at system server 104.

At step 702, the method begins.

At step 704, the server retrieves the known group key "G." The known group key corresponds with at least one rules table stored in the memory of each hub.

At step 706, the server retrieves the known private "K."

At step 708, the server picks a random number "N."

At step 710, the server will generate a cryptographic hash function "H" using the random number and the private key.

At step 712, the server generates a secure group key "S" by using a bit wise exclusive or function of the known group key and the cryptographic hash function "H."

At step 714, the server transmits the secure group key and the random number to the hub.

At step 716, the method returns.

Figure 8:
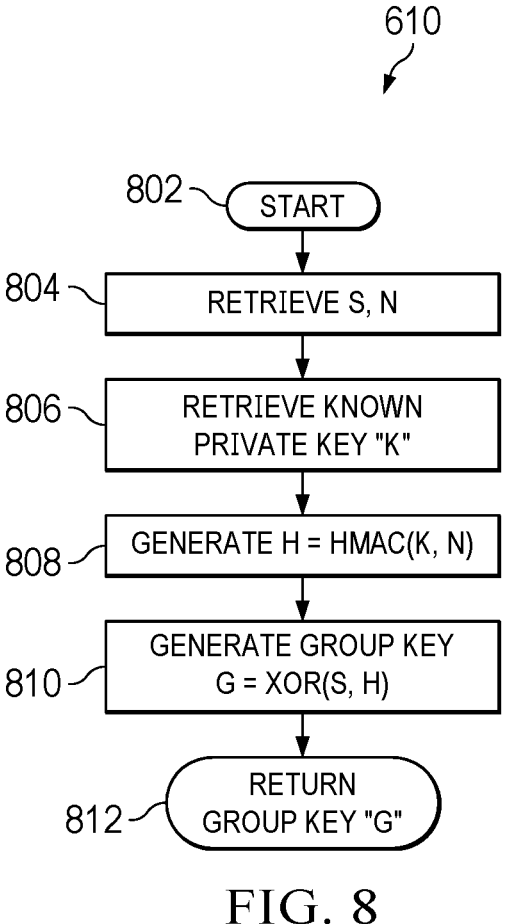
FIG. 8 is a flowchart of a preferred decode group key method.

Referring then to FIG. 8, a preferred method of decoding a secure group key as described in step 610 will be further described.

At step 802, the method begins.

At step 804, the processor retrieves the secure group key and the random number from memory.

At step 806, the server retrieves the known private "K" from memory.

At step 808, the processor generates a secure cryptographic hash function using the known private key "K" and the random number "N."

At step 810, the group key "G" is generated by a bit wise exclusive or core function of the secure group key and the cryptographic hash function "H."

At step 812, the processor returns the group key "G."

Figure 9:
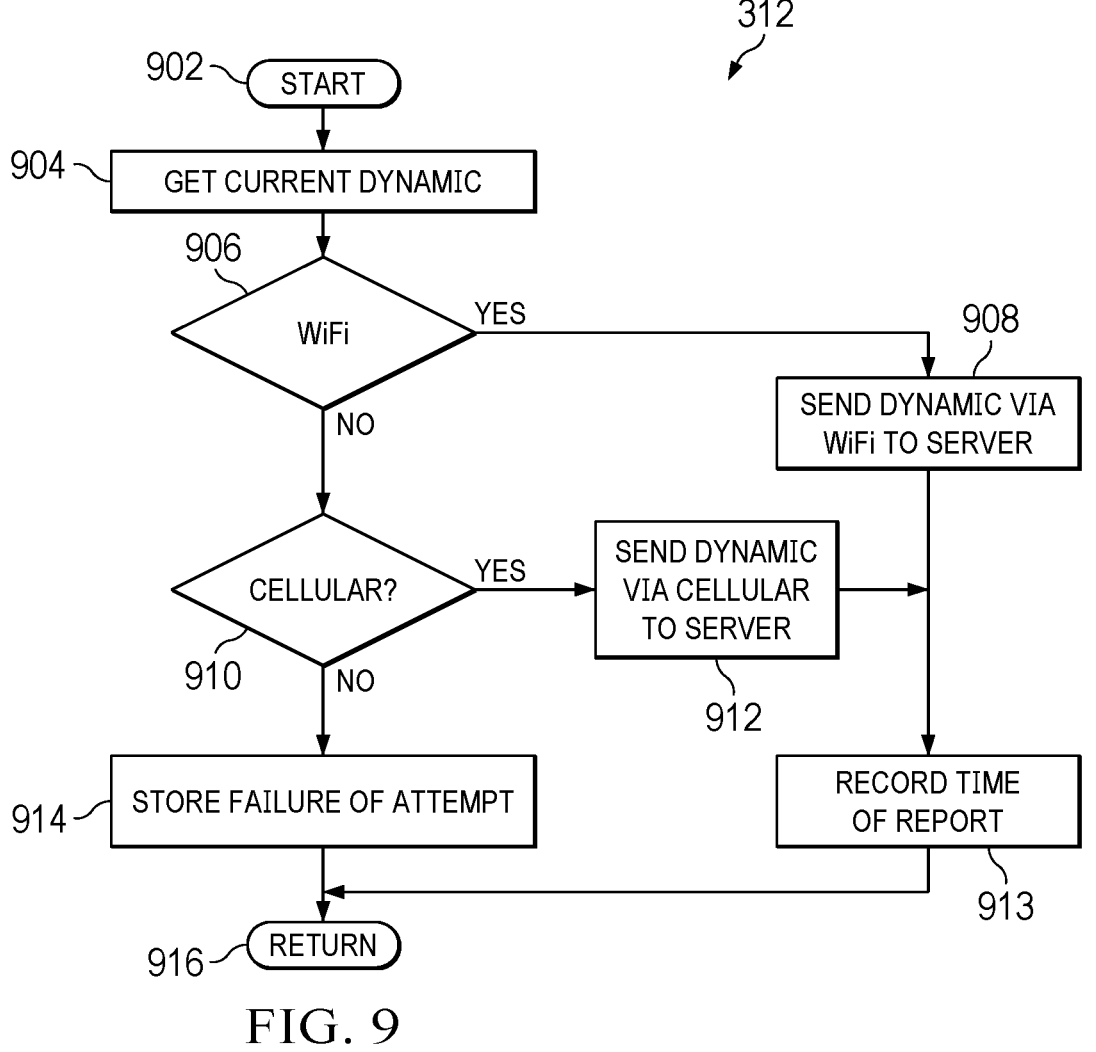
FIG. 9 is a flowchart of a preferred report method.

Referring then to FIG. 9, a preferred method of reporting as described in step 312, will be further described.

At step 902, the method begins.

At step 904, the processor retrieves its internal dynamic from memory.

At step 906, the processor determines whether or not a Wi-Fi signal is present. If so, the method moves to step 908, if not, the method moves to step 910.

At step 908, the processor sends the current dynamic to the server via the Wi-Fi transceiver. The method then moves to step 916.

At step 910, the processor determines whether or not a cellular signal is present. If so, the method moves to step 912. If not, the method moves to step 914.

At step 912, the processor sends the dynamic to the server via cellular service. The method then moves to step 916.

At step 913, the processor records the time that the report was sent in memory.

At step 914, the processor stores the failure of the report attempt in memory.

At step 916, the method returns.

The invention claimed is:

1. A self-configuring asset tracking and monitoring system comprising:

a server;

a plurality of hubs, each hub of the plurality of hubs having a processor, a memory, and a battery having a battery life, the plurality of hubs having a collective battery life;

each processor operatively connected to a set of sensors;

each processor operatively connected to a set of transceivers adapted to connect to the server; and each memory containing a set of instructions that when executed by each processor cause each hub, of the plurality of hubs, to carry out the steps of:

assembling an internal dynamic memory structure formatted as a packed bit-field status structure from a first set of electronic status data from at least one of a group of a first set of sensors of the set of sensors and a first set of transceivers of the set of transceivers;

receiving an external dynamic memory structure via short-range hub-to-hub transceiver communication, the external dynamic memory structure containing a second set of electronic status data from at least one of a group of a second set of sensors of the set of sensors and a second set of transceivers of the set of transceivers from another hub of the plurality of hubs;

making a predicate word comparison by comparing the internal dynamic memory structure to the external dynamic memory structure to derive a predicate word comprising a multi-bit suitability indicator reflecting relative reporting suitability of the plurality of hubs based on the first set of electronic status data and the second set of electronic status data; and executing a function set of computer instructions corresponding to the predicate word, including selecting whether each respective hub performs an upstream server-reporting function based on the predicate word such that only a hub selected by the predicate word comparison transmits to the server during a reporting interval, and extending the collective battery life of the plurality of hubs by limiting upstream server transmissions to the hub selected.

2. The self-configuring asset tracking and monitoring system of claim 1, wherein each processor is further connected to a warning indicator and the function set of computer instructions further comprises instructions to:

activate the warning indicator when the predicate word indicates an error condition comprising a verification failure or an authentication failure of the external dynamic memory structure, including detection of an invalid predetermined constant value or an invalid digital signature.

3. The self-configuring asset tracking and monitoring system of claim 1, wherein the function set of computer instructions further comprises instructions to:

report the internal dynamic memory structure to the server only when each respective hub is selected by the predicate word as having reporting suitability.

4. The self-configuring asset tracking and monitoring system of claim 3, wherein the set of transceivers further comprises:

a Wi-Fi transceiver, a cellular transceiver, and a Bluetooth transceiver; and wherein the step of reporting further comprises:

reporting the internal dynamic memory structure to the server using the Wi-Fi transceiver when the Wi-Fi transceiver has a first signal; and reporting to the server using the cellular transceiver when the Wi-Fi transceiver does not have the first signal and the cellular transceiver has a second signal, the reporting occurring only when each respective hub is selected for upstream reporting based on the predicate word;

wherein the step of receiving further comprises:

receiving the external dynamic memory structure via short-range hub-to-hub communication using the Bluetooth transceiver.

5. The self-configuring asset tracking and monitoring system of claim 3, wherein each of the first set of electronic status data and the second set of electronic status data further comprises at least one of a group of humidity, pressure, temperature, battery status, GPS fix, Wi-Fi fix, cellular fix, fixed location status and motion status.

6. The self-configuring asset tracking and monitoring system of claim 3, wherein packed bit-field status structure is formed by a combination of a C-language union construct and a C-language struct construct to pack a set of status fields into a fixed-layout memory block.

7. The self-configuring asset tracking and monitoring system of claim 3, wherein the internal dynamic memory structure further comprises:

a predetermined constant value used for verification purposes and a digital signature based on the predetermined constant value used for verification purposes.

8. The self-configuring asset tracking and monitoring system of claim 7, wherein the predetermined constant value used for verification purposes and the digital signature are encapsulated by a C-language union instruction.

9. The self-configuring asset tracking and monitoring system of claim 1, wherein the predicate word further comprises a 5-bit word.

10. The self-configuring asset tracking and monitoring system of claim 1, wherein the step of comparing further comprises:

deriving a first comparison between an internal battery status and an external battery status.

11. The self-configuring asset tracking and monitoring system of claim 10, wherein the function set of computer instructions further comprises instructions to:

limit the upstream server transmissions, if the first comparison indicates that the internal battery status is greater than the external battery status.

12. The self-configuring asset tracking and monitoring system of claim 10, wherein the step of comparing further comprises:

deriving a second comparison between an internal cellular fix and an external cellular fix.

13. The self-configuring asset tracking and monitoring system of claim 10, wherein the step of comparing further comprises:

deriving a second comparison between an internal GPS fix and an external GPS fix; and deriving a third comparison between an internal Wi-Fi fix and an external Wi-Fi fix.

14. The self-configuring asset tracking and monitoring system of claim 13, wherein the function set of computer instructions further comprises instructions to:

limit the upstream server transmissions if:

the first comparison indicates that the internal battery status is greater than the external battery status;

the second comparison indicates that the internal GPS fix is greater than the external GPS fix; and the third comparison indicates that the internal Wi-Fi fix is greater than the external Wi-Fi fix.

15. The self-configuring asset tracking and monitoring system of claim 13, wherein the step of comparing further comprises:

deriving a fourth comparison between an internal fixed location indicator and an external fixed location indicator; and deriving a fifth comparison between an internal moving indicator and an external moving indicator.

16. The self-configuring asset tracking and monitoring system of claim 15, wherein the function set of computer instructions further comprises instructions to:

select each respective hub to limit the upstream server transmissions if:

the fourth comparison is greater than the fifth comparison; or the fifth comparison is greater than the fourth comparison.

17. The self-configuring asset tracking and monitoring system of claim 1, wherein the set of instructions further comprises instructions that when executed by each processor cause each hub, of the plurality of hubs, to carry out the steps of:

authenticating the external dynamic memory structure; and validating the external dynamic memory structure.

18. The self-configuring asset tracking and monitoring system of claim 17, wherein the step of validating further comprises:

comparing a digitally signed message to a message table.

19. The self-configuring asset tracking and monitoring system of claim 17, wherein the step of authenticating further comprises:

generating a group key from a cryptographic group key that identifies the plurality of hubs and a cryptographic private key held by a receiving hub; and comparing the group key to a group key table of authorized group keys for authentication.

20. The self-configuring asset tracking and monitoring system of claim 1, wherein the set of instructions further comprises instructions that when executed by each processor cause each hub, of the plurality of hubs, to carry out the steps of:

comparing a radio signal strength of the external dynamic memory structure to a minimum radio signal strength; and erasing the external dynamic memory structure if the radio signal strength of the external dynamic memory structure is not above the minimum radio signal strength.

21. The self-configuring asset tracking and monitoring system of claim 1, wherein the set of instructions further comprises instructions that when executed cause each hub, of the plurality of hubs, to carry out the steps of:

counting a number of matched external dynamic memory structures received; and erasing the external dynamic memory structure if the number of matched external dynamic memory structures received is not above a minimum count threshold.

22. A method of configuring a set of hubs to communicate with a server comprising:

providing each hub, of the set of hubs, with a processor operatively connected to a memory;

providing each hub, of the set of hubs, with a set of transceivers operatively connected to each processor;

providing each hub, of the set of hubs, with a set of sensors operatively connected to each processor;

providing each hub, of the set of hubs, with a battery having a battery life, the set of hubs having a collective battery life;

assembling, at a first hub, a first dynamic memory structure formatted as a first packed bit-field status structure from a first set of status data from a first set of sensors and a first set of transceivers, of the first hub;

transmitting the first dynamic memory structure via short-range hub-to-hub transceiver communication to a second hub of the set of hubs;

receiving, at the first hub, a second dynamic memory structure, formatted as a second packed bit-field status structure, the second dynamic memory structure containing a second set of status data from a second set of sensors and a second set of transceivers, of the second hub;

determining a reporting condition by deriving a predicate bit-word comprising a multi-bit suitability indicator reflecting relative reporting suitability of the first hub, the predicate bit-word derived by making a predicate bit-word comparison by comparing the first dynamic memory structure to the second dynamic memory structure; and reporting to the server with a transceiver of the first set of transceivers only when the first hub is selected by the predicate bit-word comparison to perform an upstream server-reporting function and extending the collective battery life of the set of hubs by limiting upstream server transmissions by each hub of the set of hubs.

23. The method of claim 22, wherein the step of determining further comprises:

evaluating a first battery strength of the first hub to a second battery strength of the second hub.

24. The method of claim 22, wherein the step of determining further comprises:

evaluating a first transceiver signal strength of the first hub to a second transceiver signal strength of the second hub.

25. The method of claim 22, wherein the step of determining further comprises:

evaluating a first GPS signal strength of the first hub to a second GPS signal strength of the second hub.

26. The method of claim 22, wherein the step of determining further comprises:

determining the reporting condition based on an accelerometer status.

27. The method of claim 22, wherein the step of determining further comprises:

determining the reporting condition based on a fixed location indicator.

28. The method of claim 22, wherein the step of comparing further comprises:

determining the reporting condition based on a predicate word assembled from the first set of status data.

29. The method of claim 22, wherein the step of assembling further comprises:

digitally signing a message word.

30. The method of claim 22, wherein the step of comparing further comprises:

authenticating a digital signature carried within the second dynamic memory structure before accepting the second dynamic memory structure as valid.

31. The method of claim 22, wherein the step of comparing further comprises:

authenticating and validating the second dynamic memory structure.

32. The method of claim 22, wherein the step of transmitting further comprises:

transmitting with a Bluetooth transceiver of the set of transceivers.

33. The method of claim 32, wherein the step of reporting further comprises:

reporting with one of a group of a Wi-Fi transceiver, a cellular transceiver, and both of the Wi-Fi transceiver and the cellular transceiver of the set of transceivers.

\* \* \* \* \*